US008804092B2

(12) United States Patent
Klement et al.

(10) Patent No.: US 8,804,092 B2
(45) Date of Patent: Aug. 12, 2014

(54) MODULATION ELEMENT COMPRISING A MESOGENIC MODULATION MEDIUM HAVING A CYBOTACTIC NEMATIC PHASE THAT SHOWS TWO DISTINCT ELECTRO-OPTICAL TRANSITIONS AT ONE SINGLE TEMPERATURE

(75) Inventors: Dagmar Klement, Darmstadt (DE); Atsutaka Manabe, Bensheim (JP); Nobuo Kubo, Kanagawa (JP)

(73) Assignee: Merck Patent GmbH, Darmstadt (DE)

( * ) Notice: Subject to any disclaimer, the term of this patent is extended or adjusted under 35 U.S.C. 154(b) by 638 days.

(21) Appl. No.: 12/600,071

(22) PCT Filed: Apr. 23, 2008

(86) PCT No.: PCT/EP2008/003244
§ 371 (c)(1),
(2), (4) Date: Nov. 13, 2009

(87) PCT Pub. No.: WO2008/138456
PCT Pub. Date: Nov. 20, 2008

(65) Prior Publication Data
US 2010/0309398 A1    Dec. 9, 2010

(30) Foreign Application Priority Data

May 16, 2007 (EP) .................................. 07009781

(51) Int. Cl.
*C09K 19/02* (2006.01)
(52) U.S. Cl.
USPC ........................... 349/168; 349/167; 349/177
(58) Field of Classification Search
USPC ............................... 349/177, 19, 20, 167–170
See application file for complete search history.

(56) References Cited

U.S. PATENT DOCUMENTS

| 2004/0191427 A1 | 9/2004 | Wood et al. | |
| 2005/0067605 A1 | 3/2005 | Lussem et al. | |
| 2006/0006363 A1* | 1/2006 | Heckmeier et al. | 252/299.01 |

FOREIGN PATENT DOCUMENTS

| EP | 0 422 904 A | 4/1991 | | |
| WO | WO-2005 096085 A1 | 10/2005 | | |
| WO | WO 2005096085 A1 * | 10/2005 | ............. | G02F 1/139 |
| WO | WO-2007 017008 A1 | 2/2007 | | |
| WO | WO 2007037575 A1 * | 4/2007 | ............. | C09K 19/58 |

OTHER PUBLICATIONS

Bistable Nematic Liquid Crystals with Self-Assembled Fibers, Advanced Materials, 2005, vol. 17, pp. 692.
Kim, Jong Hyun et al., "A bistable mode originated from symmetric alignment of nematic liquid crystal," ECLC 2001 Presentation.
Toyoda, Akito et al., "Application of TSS Liquid Crystals to time divisions displays mode stereoscopic display," Ekisho, 1999, vol. 3, No. 4, pp. 288-294.
English Abstract of Toyoda, Akito et al., "Application of TSS Liquid Crystals to time divisions displays mode stereoscopic display," Ekisho, 1999, vol. 3, No. 4, pp. 288-294.
Tamba, M. G. et al., "Electro-optic characterization of nematic phase formed by bent core mesogens," Eur. Phys. J. E., 2007, vol. 22, pp. 85-95.
Mottram, Nigel J. et al., "Order Parameter Theory for Switching in Antiferroelectric Liquid Crystals," Mol. Cryst. Liq. Cryst., 1999, vol. 330, pp. 557-564.
Mottram, Nigel J. et al., "Variable electric field in a Bistable Nematic Liquid Crystal," Liquid Crystal Theory Group at the University of Strathclyde, 2005.
Mueller, Stefan et al., "Passive Phase Shifter for W-Band Applications using Liquid Crystal," European Microwave Conference, 2006, pp. 54-57.
International Search Report for PCT/EP2008/003244 dated Jul. 15, 2008.

* cited by examiner

*Primary Examiner* — Paul Lee
(74) *Attorney, Agent, or Firm* — Millen, White, Zelano & Branigan, P.C.

(57) ABSTRACT

The present invention relates to modulation elements for electromagnetic radiation and to modulation devices and systems comprising these devices, such as e.g. television screens and computer monitors, as well as to micrometer wave components. The modulation elements according to the invention comprise a mesogenic modulation medium with a dielectric anisotropy, which shows two or more distinct transitions upon application of an electric field. The mesogenic modulation media used in the modulation elements for electromagnetic radiation are also a subject of the present invention.

27 Claims, No Drawings

MODULATION ELEMENT COMPRISING A MESOGENIC MODULATION MEDIUM HAVING A CYBOTACTIC NEMATIC PHASE THAT SHOWS TWO DISTINCT ELECTRO-OPTICAL TRANSITIONS AT ONE SINGLE TEMPERATURE

FIELD OF THE INVENTION

The present invention relates to modulation elements for electromagnetic radiation and to devices comprising the same. The modulation elements for electromagnetic radiation use modulation media with a dielectric anisotropy, which, upon application of an electric field show with increasing strength of the electrical field, undergoes two or more distinct transitions at least at one of the operation temperatures of the modulation element.

Modulation elements for electromagnetic radiation may be e.g. electro-optical modulation elements, which may be used e.g. in electro-optical displays or electrically controllable components for millimeter- and/or micrometer wave technology:

In the present invention modulation elements are elements, which are capable to modulate and/or switch a physical property like e.g. the dielectric permittivity or the optical transmission. They are also called switching/modulating elements. The same definition applies to the modulation devices according to the present invention.

In a first embodiment the present invention relates to electro-optical displays and display systems containing elements of this type, such as, for example, television screens and computer monitors. The light modulation elements according to the invention comprise a mesogenic modulation medium having a dielectric anisotropy, preferably a positive dielectric anisotropy, which shows two or more distinct electro-optical transitions during operation of the light modulation elements.

The present invention further, in a second embodiment, relates to components for high-frequency technology or for ultrahigh-frequency technology, in particular for millimeter- and/or for microwave components. It very particularly relates to controllable components, preferably millimeter- and/or microwave components, which use mesogenic media, preferably liquid crystals and most preferably nematic liquid crystals, as controllable dielectrics. These controllable dielectrics preferably have a positive dielectric anisotropy. Particular preference is given to passively controllable components.

Further, the present invention relates to the mesogenic media having a dielectric anisotropy, preferably a positive dielectric anisotropy, which are showing, upon application of an electric field, with increasing field strength two or more distinct transitions in modulation elements, preferably in light modulation elements and/or in microwave modulation components as well as to the use of these media as modulation media in such modulation elements.

OBJECT OF THE PRESENT INVENTION AND PRIOR ART

Conventional electro-optical liquid-crystal displays are known in general terms. They are operated at a temperature at which the modulation medium is in a mesophase, typically and predominantly in the nematic phase. But there are also displays which use liquid crystals in a smectic phase, e.g. in the chiral smectic $C(S_C)$ phase, like SSFLC (surface stabilised ferroelectric liquid crystal) displays or in the smectic A $(S_A)$ phase, e.g. thermally addressed displays. Especially SSFLC and anti-ferroelectric displays show extremely good, fast response, however, they are rather difficult to produce. Further, anti-ferroelectric displays are generally very sensitive to mechanical shock.

Electro-optical liquid-crystal displays which are operated at a temperature at which the modulation medium is in the cybotactic phase are disclosed e.g. in WO 2005/096085.

The most widely spread displays are TN ("twisted nematic") and STN ("super twisted nematic") displays. The liquid-crystal cells in these displays have electrodes on the substrates on the two opposite sides of the liquid-crystal medium. The electric field is thus essentially perpendicular to the liquid-crystal layer. The first-mentioned displays in particular are used in combination with TFT (thin film transistor) addressing for displays having a large information content and high resolution, for example in laptop and notebook computers. Use has recently increasingly been made, in particular in desktop computer monitors, of liquid-crystal displays of the IPS (in-plane switching, for example DE 40 00 451 and EP 0 588 568) type or alternatively of the VAN (vertically aligned nematic) type. VAN displays are a variant of the ECB (electrically controlled birefringence) displays. In a modern variant of the ECB displays, the MVA (multidomain vertically aligned) displays, a plurality of domains are stabilised per addressed electrode, and in addition a special optical compensation layer is used. These displays, like the TN displays already mentioned, use an electric field perpendicular to the liquid-crystal layer. In contrast thereto, IPS displays generally use electrodes on only one substrate, i.e. on one side of the liquid-crystal layer, i.e. are characterised by a significant component of the electric field parallel to the liquid-crystal layer.

In common electro-optical switching elements exploiting electro-optical effects in mesogenic modulation media the electro-optical response is characterised by one (i.e. a single) electro-optical transition. This electro-optical transition typically is either a gradual transition, as e.g. the Freedericks transition as e.g. in TN-displays or a step-wise or quasi-stepwise transition as e.g. in FLCD or in STN LCDs, which all show bistability or quasi bistable response. In some exceptional cases there is also an electro-optical transition with a hysteresis of the response curve e.g. in anti-ferroelectric displays (see e.g. Toyoda, Akito and Yamamoto, Norio, Ekisho, Vol. 3, No. 4 (1999): "Application of Tri-State Switching (TSS) Liquid Crystals for Field Sequential Stereoscopic Display" and Mottram, N. J. and Elston, S. J., Molecular Crystals and Liquid Crystals, Vol. 330 (1999) p. 557: "Order Parameter Theory for Switching in Antiferroelectric Liquid Crystals".

The present invention had the object of developing modulation elements, which show two or more distinct transitions, preferably two of which are of mutually different types (e.g. of continuous-, bistable- or hysteresis type) and most preferably with two distinct transitions, e.g. two distinct electro-optical transitions.

Alternatively two or more of said two or more transitions are of the same type. Especially preferred amongst these embodiments of the present invention are those, where the response to the electrical field has three stable or at least quasi-stable states. A quasi stable state is characterized by a range of voltages, typically varying over at least some/several 100 mV, over which the characteristic response, e.g. the effective dielectric permittivity or the transmission, of the modulation element or elements does vary only within a relatively small range, e.g. over some percent only.

The present invention had, as one embodiment, the object of providing electro-optical light modulation/switching elements, which show two or more, preferably two, distinct transitions.

The present invention had the further object of providing controllable microwave components, which show two or more distinct transitions. In this application the preferred microwave region is the region of frequencies ranging from 1 to 26 GHz, preferably of the X-band and most preferably ranging from 8.3 to 8.75 GHz.

Analogous passively controllable microwave components have been realized with the aid of nonlinear dielectrics. Nonlinear dielectrics are materials whose dielectric constant $\in_r$ is highly dependent on the effective electric field strength in the material. The internal electric polarisation can be modified as a function of an external electric field or an applied electric voltage.

So far, conventional controllable millimeter wave and microwave components have been generally realized, as e.g. reported in WO 2004/106391, using materials in the solid phase. But the dielectric loss of these devices significantly increases when the frequency increases in the microwave region.

U.S. Pat. No. 5,195,972 and U.S. Pat. No. 5,537,242, amongst others, propose to use liquid crystals as modulation media for controllable components operating in the millimeter- and micometer wave region.

Recently, aiming at microwave communication, e.g. US 2005/0067605 A1 and Müller et al., "Passive Phase Shifter for W-band Applications using Liquid Crystals", 36$^{th}$ European Microwave Conference, 2006 a switching device using liquid crystalline modulation media has been proposed for this wavelength regime.

It has been reported, that the insertion loss of such devices is significantly lower than that of the hitherto conventional devices. This advantage even increases with increasing frequency. Considering this fact, it is expected that novel switching/modulating devices based on the present invention offer even higher flexibility of design with extremely low insertion losses.

A desired embodiment of a device is e.g. a variable capacitor with special characteristic, i.e. having three or more distinct values of the capacitance depending on the control voltage applied to the modulation medium.

Thus, there is a considerable demand for improved modulation elements for electromagnetic radiation like light modulation elements and controllable millimeter- and micometer wave components, as well as for their respective modulation media.

PRESENT INVENTION

Surprisingly, it has been found that modulation elements for electromagnetic radiation which
- have an electrode arrangement which is able to generate an electric field, and
- comprise a mesogenic medium having a dielectric anisotropy, preferably a positive dielectric anisotropy,
- show two or more distinct electro-optical transitions at least at one of the operation temperatures of the light modulation element enable the production of excellent devices.

Preferably these modulation elements
- are operated at a temperature at which the mesogenic medium is in the nematic phase and shows two or more, preferably two, distinct electro-optical transitions.

In other words two, three, four and so on more distinct responses of the effective dielectric anisotropy on the electric field, respectively, correspond to three, four five and so on distinct orientations, also called states of the director of the mesogenic medium. I.e. the number of orientation states is always larger by one, at least, than the number of electro-optical transitions.

In some cases, which according to some applications (like e.g. memory devices, electronic paper and operational elements like adders, multipliers and so on) are preferred according to the present invention, the response of the dielectric permittivity on the electric field may be bi-stable between the different states. In other words the characteristic response curve may show a more or less pronounced hysteresis.

If the elements or devices according to the present application are electro-optical switching/modulation elements or devices they preferably
- have at least one element for polarisation of the light.

In general, the contrast, the viewing angle of the contrast and the operation voltage of the light modulation elements according to the present invention are excellent. Most strikingly, however, is the existence of two or more distinct transitions leading to two more or less stable states, at least one of which is a state in an intermediate grey level.

The modulating devices according on this invention e.g. for the microwave region have an insertion loss, which is much smaller than that of the conventional devices, especially at higher frequencies and offer greater flexibility of design.

The mesogenic medium is used as modulation medium of the light modulation element. In the present application, the term mesogenic media is applied to media, which have a mesophase, are soluble in a mesophase or induce a mesophase. The modulation media preferably exhibit a mesophase, which is a smectic or, preferably, a nematic phase. Most preferably the media used according to the present invention, respectively the media used according to the present invention exhibit a nematic phase. The media may also exhibit one or more smectic phases and a nematic phase. Preferably the media exhibit a smectic phase, which transforms into a nematic phase with increasing temperature. Preferably the media show a temperature range over which two meso-phases, preferably a smectic and the nematic phase, are present simultaneously and/or over which a cybotactic phase is present.

The medium used for investigating the mesogenic properties of materials, i.e. compounds components, like e.g. premixtures and media, which do not have a mesophase of their own is preferably the nematic mixture ZLI-4792 from Merck KGaA, Darmstadt, Germany. The mesogenic materials preferably have a clearing point, extrapolated from 10% solution in this mixture, of 0° C. or above, particularly preferably of 20° C. or above and very particularly preferably of 40° C. or above.

The modulation elements for electromagnetic radiation according to the invention preferably contain a mesogenic modulation medium which is in the cybotactic phase or in the nematic phase, preferably in the nematic phase at a temperature closely above the transition from the cybotactic phase, at the operating temperature or at least at one of the operation temperatures of the modulation elements for electromagnetic radiation. Preferably the media have a cybotactic phase and a nematic phase and the light modulation media are operated at a temperature in the range of 0° to 10°, more preferably of 0.1° to 5°, more preferably of 0.1° to 2° and most preferably or 0.1° to 1°, above the temperature of the transition of the medium from the cybotactic to the nematic phase.

This mesogenic medium is advantageously located on or below one substrate. In general, the mesogenic medium is located between two substrates. If the mesogenic medium is located between two substrates, preferably at least one of these substrates is transparent for light. The light transparent substrate or the light transparent substrates may, for example, consist of glass, quartz or plastic. In case the substrate used is not transparent for light, the substrate may consist, amongst others, of a metal or a semiconductor. These materials can be used as such for the substrate or can be located on a support, for example a ceramic.

The light modulation elements according to the present invention have an electrode structure, which generates an electric field having a significant component, preferably a predominant component, perpendicular to the main plane or layer of the mesogenic medium. This electrode structure may be designed in the conventional form. It preferably comprises active addressing elements in order to allow addressing of the displays by means of an active matrix. Active matrix displays of this type use a matrix of active addressing elements preferably one each assigned to each one of the individual light modulation elements. These active addressing elements have a non-linear current-voltage characteristic line, such as, for example, TFTs or MIM (metal insulator metal) diodes.

The electrodes may consist of transparent material, such as, for example, indium tin oxide (ITO). In this case, it may be advantageous and in some cases even necessary to cover part or parts of the light modulation element by means of a black mask. This allows areas in which the electric field is not effective, as well as areas where constituents of the light modulation elements, e.g. the active addressing elements, are light sensitive, to be screened off and the contrast, respectively the performance of the light modulation elements thus improved. However, the electrodes may also consist of opaque material, usually metal. In this case, the use of a separate black mask may, if desired, be omitted.

In a preferred embodiment, the sub-structures of the electrode structure are located on the two opposite sides of the mesogenic medium. In this case, the corresponding parts of the electrodes are preferably located at the opposite sides of the light modulation medium perpendicular to one another or at least overlapping each other to a significant extent, preferably to a predominant extent and most preferably essentially completely viewed perpendicularly from the main plane of the light modulation element.

The operating temperature of the modulation elements according to the present invention is preferably above the transition temperature of the modulation medium, generally from the higher ordered phase, i.e. the solid phase the smectic phase or the cybotactic phase into the nematic phase, preferably, from a liquid crystalline phase, and most preferably from the cybotactic phase, into the nematic phase. In general it is in the range from 0.1° to 140° preferably from 0.1° to 130° above this transition temperature, preferably in the range from 0.1° to 120° above this transition temperature and particularly preferably in the range from 0.1° to 100° above this transition temperature.

The nematic phase of the modulation media extends preferably over a temperature range which has a width of 60° or more, more preferably of 80° or more, even more preferably of 100° or more and most preferably or 120° or more.

The light modulation elements according to the invention contain at least one element for polarisation of the light. In addition, they preferably contain a further optical element. This further optical element is either a second element for polarisation of the light, a reflector or a transflector or a combination of one or more of these elements.

The optical elements of the light modulation elements according to the invention are arranged in such a way that the light, on passing through the mesogenic medium of the light modulation element, passes at least once through at least one polarising element both before entering the mesogenic medium and after exiting from the mesogenic medium.

In a preferred embodiment of the light modulation elements according to the present invention, the mesogenic medium is located between two polarizers, i.e. a polarizer and an analyzer. Two linear polarizers are preferably used. In this embodiment, the absorption axes of the polarizers are preferably crossed and preferably form an angle of 90°.

The layer thickness (d) of the mesogenic modulation medium in the light modulation elements according to the present invention is preferably from 0.1 µm to 150 µm, particularly preferably from 0.2 µm to 100 µm, particularly preferably from 0.5 µm to 80 µm and very particularly preferably from 0.6 µm to 60 µm.

The light modulation elements according to the present invention may additionally contain one or more further optical elements, such as birefringent layers (for example compensation layers), diffuser layers and elements for increasing the brightness and/or the light yield, or viewing-angle dependence, where this list is not exhaustive.

The contrast of the light modulation elements according to the present invention is well comparable with that of respective light modulation elements operating in the same cell structure, respectively electro-optical mode. If it is found to be slightly inferior in cases, it can be easily improved by applying respectively higher operation voltages. Their outstanding properties, however, are their flexibility with respect to realize characteristic responses to the electric field having two or more transitions, which are more or less distinct from each other.

The light modulation elements according to the present invention may be, and preferably are, constructed like conventional light modulation elements operating in the TN mode, i.e. like typical TN cells, but also the OCB (optically compensated bend), IPS (in plane switching) and FFS (fringe field switching) modes.

Preferably the light modulation elements according to the present invention have positive contrast and the absorption axis of the polarizers perpendicular to the preferential alignment of the nematic, respectively cybotactic nematic liquid crystals at the adjacent substrate.

Preferably the light modulation elements according to the present invention operating in the TN mode have an optical retardation in the range of 0.30 µm to 1.20 µm, preferably in the range from 0.32 µm to 0.60 µm and most preferably from 0.35 µm to 0.55 µm.

Preferably the mesogenic modulation media for non-display applications are not chiral. In such switching/modulation devices, such as spatial light modulators (SLM), high-speed electro-optic shutters for the communication technology, as described in Chang, M.-S., Panarin, Yu. P., and Farrell, G. SPIE 2002, the switching time is much shorter than that of those typically used in display application.

Electro-optical displays according to the present invention contain one or more light modulation elements according to the present invention. In a preferred embodiment, these are preferably addressed by means of an active matrix.

Electro-optical displays according to the present invention may, in particular if they are used for television screens, computer monitors or the like, contain a colour filter for the display of coloured images. This colour filter advantageously consists of a mosaic of filter elements of different colours.

Typically, an element of the colour filter mosaic of a colour is assigned to each Modulation elements for electromagnetic radiation.

The properties of the media used according to the present invention for modulation elements operating in the micrometer wave range may be beneficially characterized applying the interfering-body measurement method described in detail in US 2005/0067605 A1.

Preferred components using switching/modulation elements according to the present invention operating in the micrometer wave range are phase shifters, varactors, radio wave antenna arrays and the like.

The preferred mesogenic modulation media operating in the millimeter and/or micrometer wave range, preferably in the micrometer wave range, used according to the present invention have phase shifter qualities of 15°/dB or more, preferably 20°/dB or more, preferably 30°/dB or more, preferably 40°/dB or more, preferably 50°/dB or more, particularly preferably 80°/dB or more and very particularly preferably 100°/dB or more.

The material quality $\Delta n$(millimeter and/or micrometer waves)/tan($\delta$), preferably $\Delta n$(micrometer waves)/tan($\delta$), of the preferred mesogenic modulation media operating in the millimeter and/or micrometer wave range, preferably in the micrometer wave range, used according to the present invention is 3 or more, preferably 4 or more, preferably 5 or more, preferably 10 or more, preferably 15 or more, preferably 17 or more, particularly preferably 20 or more and very particularly preferably 25 or more.

The mesogenic modulation media operating in the micrometer wave range used according to the present invention preferably have a positive dielectric anisotropy. This is preferably 5 or greater, preferably 10 or greater, particularly preferably 20 or greater and very particularly preferably 30 or greater.

In some embodiments, however, it is also possible and advantageous to use liquid crystals having a negative dielectric anisotropy.

In a preferred embodiment of the present invention mesogenic media in accordance with the present invention have a nematic phase.

In a preferred embodiment of the present invention mesogenic media in accordance with the present invention have a nematic phase which extends over a range having a width of 80° or more, preferably of 90° or more and most preferably of 100° or more. Preferably this range of the cybotactic nematic phase is extending around and preferably centred around the operation temperature of the light modulation element, preferably around ambient temperature and most preferably at a temperature of about 20° C.

In the case that the operating temperature of the light modulation elements is different from the ambient temperature, the temperature range of the nematic phase encompasses and preferably is centred on the operating temperature. In several cases the operation temperature of the light modulation elements is higher than the ambient temperature. This is e.g. generally the case in of displays having back-lighting, and in particular in the case of projection displays, the temperature during operation may rise up to 60° C. or even more. Here, the clearing point of the media used according to the present invention is preferably in the range from 70° C. to 130° C. and particularly preferably in the range from 80° C. to 150° C.

The nematic phase of the mesogenic modulation media used according to the present invention is preferably stable over a temperature range of 70° or more, preferably of 80° or more, more preferably of 90° or more, most preferably of 100° or more and in particular preferably of 120° or more. The mesogenic modulation media used according to the present invention preferably do not crystallize down to temperatures of 0° C. or lower, particularly preferably down to temperatures of −20° or lower, and very particularly preferably down to temperatures of −40° C. or lower.

The mesogenic media in accordance with the present invention preferably have a birefringence ($\Delta n$) at 20° C. in the range of 0.06 or more to 0.35 or less, particularly preferably of 0.065 or more to 0.30 or less, very particularly preferably of 0.07 or more to 0.25 or less. In practical terms, however, it is generally 0.530 or less and usually 0.450 or less.

The mesogenic modulation media used according to the present invention have a positive dielectric anisotropy, this preferably has a value of +4.0 or more, more preferably of +5.0 or more and most preferably of +7.0 or more.

In a special, preferred embodiment of the present invention, the mesogenic modulation media used according to the present invention have a large positive dielectric anisotropy, this preferably has a value of +10.0 or more, more preferably of +15.0 or more and most preferably of +19.0 or more.

The mesogenic media in accordance with the present invention preferably consist of several compounds, preferably of from two to 40 compounds, particularly preferably from three to 30 compounds and very particularly preferably from four to 25 compounds.

The mesogenic media used according to the invention of positive dielectric anisotropy in accordance with the present invention preferably comprise a dielectrically neutral component A, preferably comprising one or more dielectrically neutral compounds comprising two rings of formula I

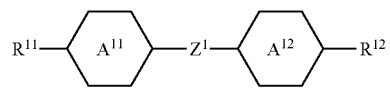

wherein $R^{11}$ and $R^{12}$ are, independently of each other, alkyl or alkoxy with 1 to 15 C atoms or alkoxyalkyl, alkenyl, alkenyloxy with 2 to 15 C atoms, preferably, $R^{11}$ is alkyl, alkoxy or alkenyl, and $R^{12}$ is alkyl or alkoxy, most preferably $R^{11}$ and $R^{12}$ and each, independently of each other, have up to 7 C-atoms,

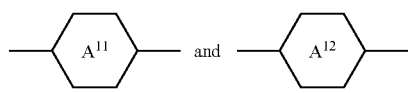

each, independently of one another, are

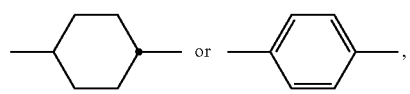

$Z^1$ is a single bond or —CH═CH—, a dielectrically positive component, component B, preferably comprising of one or more compounds with negative dielectric anisotropy, preferably of formula II

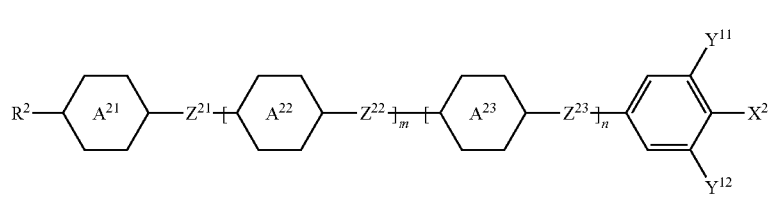

wherein
R² is alkyl or alkoxy with 1 to 15 C atoms or alkoxyalkyl, alkenyl, alkenyloxy with 1 to 15 C atoms, preferably

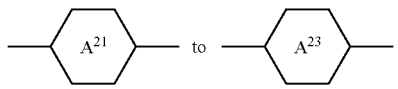

each, independently of one another, are

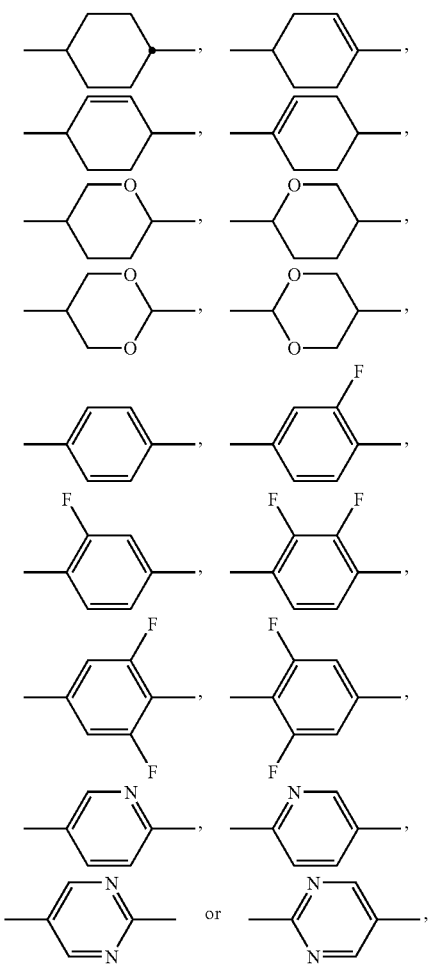

preferably

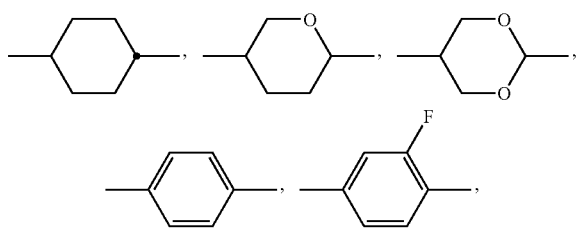

-continued

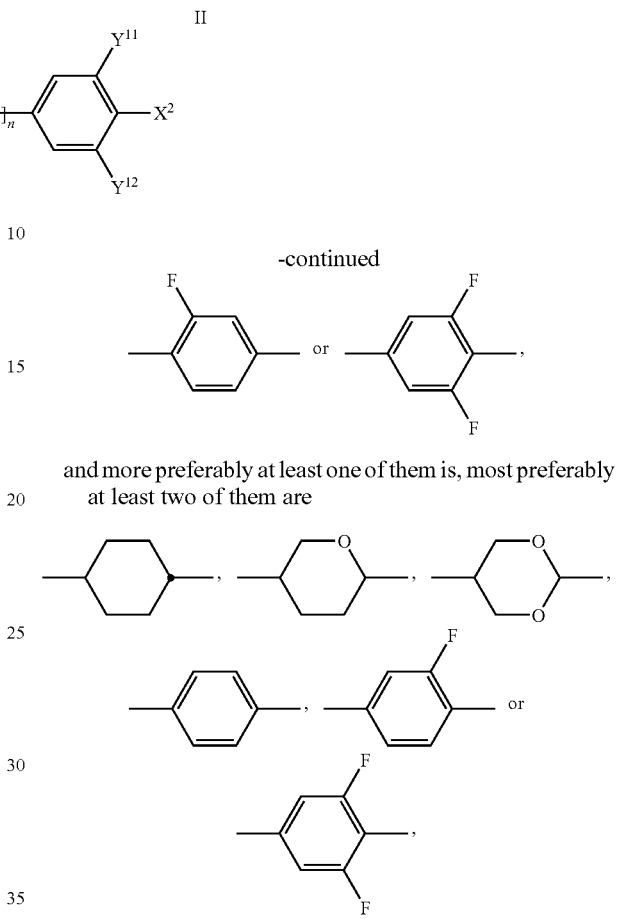

and more preferably at least one of them is, most preferably at least two of them are X² is halogen, preferably F or Cl, halogenated alkyl, alkoxy, alkenyl or alkenyloxy, preferably —F, —CF₃, —OCF₃, or —OCHF₂, Y²¹ and Y²² are each, independently of each other, H or F, preferably at least one of Y²¹ and Y²² is F, Z²¹ to Z²³ are each, independently of one another, a single bond, —CH₂—CH₂—, —CO—O—, trans —CH=CH—, —CH=CF—, —CF=CH—, —CF=CF—, —CH=CH—CO—O—, —CF=CF—CO—O—, —CF=CH—CO—O—, —CH=CF—CO—O—, —CF₂—O—, —O—CF₂—, —CH₂—O—, —O—CH₂— or —C≡C—, preferably a single bond, —CH₂—CH₂— or —CF₂—O—, more preferably Z²¹ is a single bond and one of Z²² and Z²³, if present, is a single bond or —CF₂—O— and the other one is a single bond, and m and n are each, independently of one another, 0, 1 or 2, preferably 0 or 1, while m+n is 0, 1, 2 or 3, preferably 0, 1 or 2, most preferably 0 or 1, optionally a second dielectrically neutral component, component C comprising one or more compounds of formula III

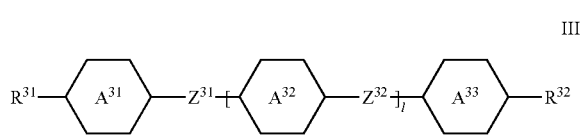

from which compounds of formula I are excluded and wherein

R³¹ and R³² are each, independently of one another, n-alkyl or n-alkoxy, each having from 1 to 7 carbon atoms, or alkenyl, alkenyloxy, alkynyl or alkoxyalkyl, each having from 2 to 7 carbon atoms, preferably n-alkyl or alkenyl, preferably n-alkyl, vinyl or 1-E-alkenyl, preferably $R^{31}$ is n-alkyl and $R^{32}$ is vinyl or 1-E-alkenyl,

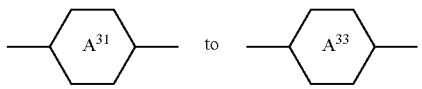

each, independently of one another, are

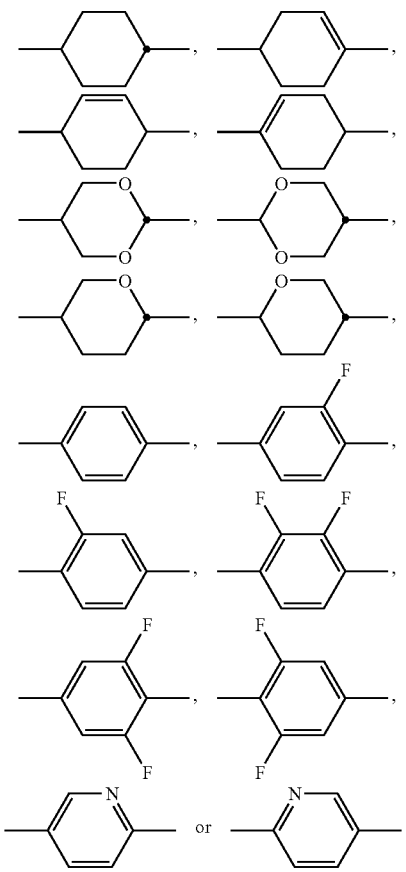

preferably

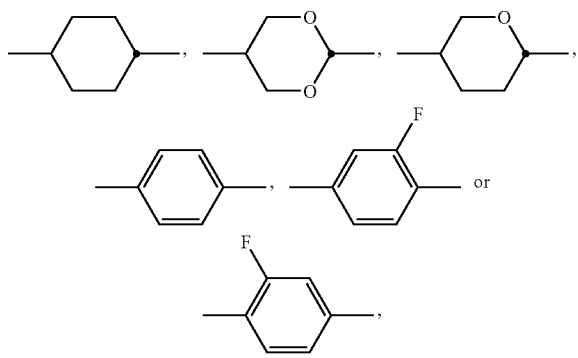

and more preferably at least one of them is, most preferably at least two of them are

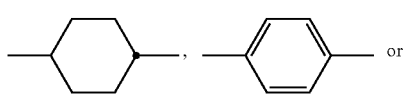

$Z^{31}$ and $Z^{32}$ are each, independently of one another, a single bond, —$CH_2$—$CH_2$—, —CO—O—, trans —CH=CH—, —CH=CF—, —CF=CH—, —CF=CF—, —CH=CH—CO—O—, —CF=CF—CO—O—, —CF=CH—CO—O—, —CH=CF—CO—O—, —$CF_2$—O—, —O—$CF_2$—, —$CH_2$—O—, —O—$CH_2$— or —C≡C—, preferably a single bond, —$CH_2$—$CH_2$— or trans —CH=CH—, preferably a single bond or trans —CH=CH—, preferably a single bond and l is 0, 1 or 2, preferably 0 or 1, preferably 0, from which compounds of formula I are excluded.

Optionally the media used according to the present invention are comprising a second dielectrically negative component, component D comprising one or more dielectrically negative compounds of formulae which are different from formula II, which may e.g. comprise annellated rings, like naphthaline, tetrahydronaphthaline, decahydronaphthaline and antracene rings, which optionally may be laterally substituted, preferably by one or more F-atoms, and/or other lateral polar groups like e.g. —CN, —NCS, —$CF_3$ or —$OCF_3$ or other moieties inducing a negative dielectric anisotropy, like e.g. thiazoles, thiadiazoles or cyclohexane rings bearing one or more axial F, —$CF_3$ or —CN substituents.

Component A of these media preferably comprises one or more compounds of the formula I and particularly preferably consists predominantly and very particularly preferably consists virtually completely of one or more compounds of the formula I.

Very preferred compounds of formula I are compounds selected from the group of formulae I-1 to I-4

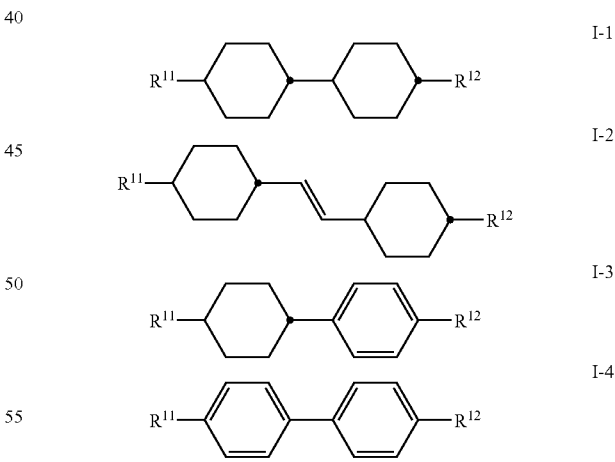

wherein $R^{11}$ and $R^{12}$ have the respective meanings given above and preferably have up to 7 C atoms each and most preferably for formula I-1

$R^{11}$ is alkyl, alkoxy or alkenyl and $R^{12}$ is alkyl or alkenyl, and particularly the pairs ($R^{11}$; $R^{12}$) are (alkyl; alkyl), (alkoxy; alkyl), (alkenyl, alkyl) or (alkenyl, alkenyl), preferably (alkenyl, alkenyl), for formula I-2

R[11] and R[12] are, independently of each other, alkyl or alkenyl and particularly the pairs (R[11]; R[12]) are (alkyl; alkyl), (alkenyl, alkyl) or (alkenyl, alkenyl), preferably (alkyl; alkyl), for formula I-3

R[11] is alkyl or alkenyl and

R[12] is alkyl or alkoxy, and particularly the pairs (R[11]; R[12]) are (alkyl; alkyl), (alkyl, alkoxy) or (alkenyl, alkyl), and for formula I-4

R[11] is alkyl, preferably methyl and

R[12] is alkenyl, preferably vinyl, 1E-propenyl, 1E-butenyl, 3E-butenyl or 3E-pentenyl and particularly the pairs (R[11]; R[12]) are (alkyl; alkyl), (alkoxy; alkyl), (alkenyl, alkyl) or (alkenyl, alkenyl), preferably (alkenyl, alkenyl), Preferably the media used according to the present application comprise one or more compounds of formula I-4.

Preferably used alkyl groups in the compounds of formula I are n-alkyl with 1 to 7 C atoms, preferably methyl, ethyl or propyl.

Preferably used alkoxy groups in the compounds of formula I are straight chain alkoxy with 1 to 6 C atoms, preferably methoxy, ethoxy or propoxy.

Preferably used alkenyl groups in the compounds of formula I are vinyl, 1E-propenyl, 1E-butenyl, 3E-butenyl or 3E-pentenyl.

Component B of these media preferably comprises one or more compounds of the formula II and particularly preferably it consists predominantly and very particularly preferably it consists virtually completely of one or more compounds of the formula II.

Very preferred compounds of formula II are compounds selected from the group of the following formulae, formulae II-1 to II-7

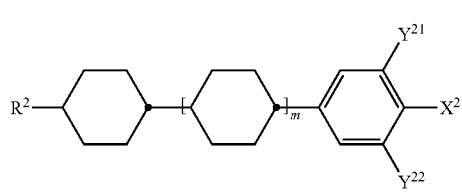

II-1

II-2

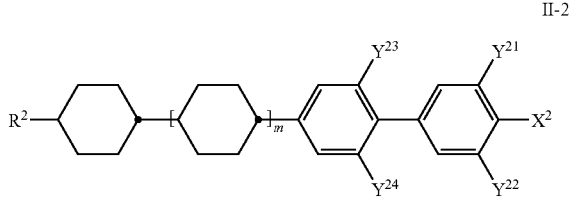

II-3

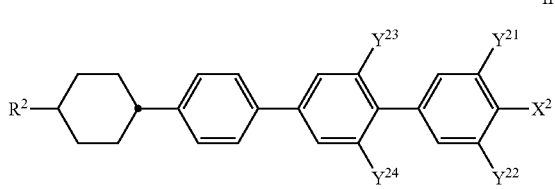

II-4

II-5

II-6

II-7

II-8 wherein

Y[23] and Y[24] are each, independently of each other, H or F, m is 0 or 1, and the other parameters have the respective meanings given under formula II above and preferably at least two of Y[21] to Y[24] present in the respective formulae are F, whereas the others present are, independently of each other, H or F, preferably they are H, and preferably R[2] is alkyl or alkenyl with 1, respectively 2, to 7 C-atoms and X[2] is F, Cl or —OCF$_3$.

Very preferred compounds of formula II are compounds selected from the group of the following sub-formulae, sub-formulae II-1a to II-8a, preferably II-1a, II-1b, II-1e, II-2c, II-2i, II-4a, II-4c, II-4f,

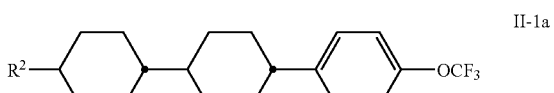

II-1a

II-1b

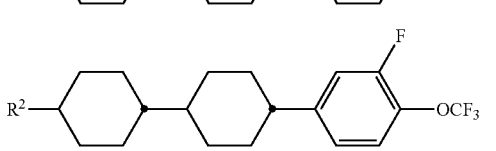

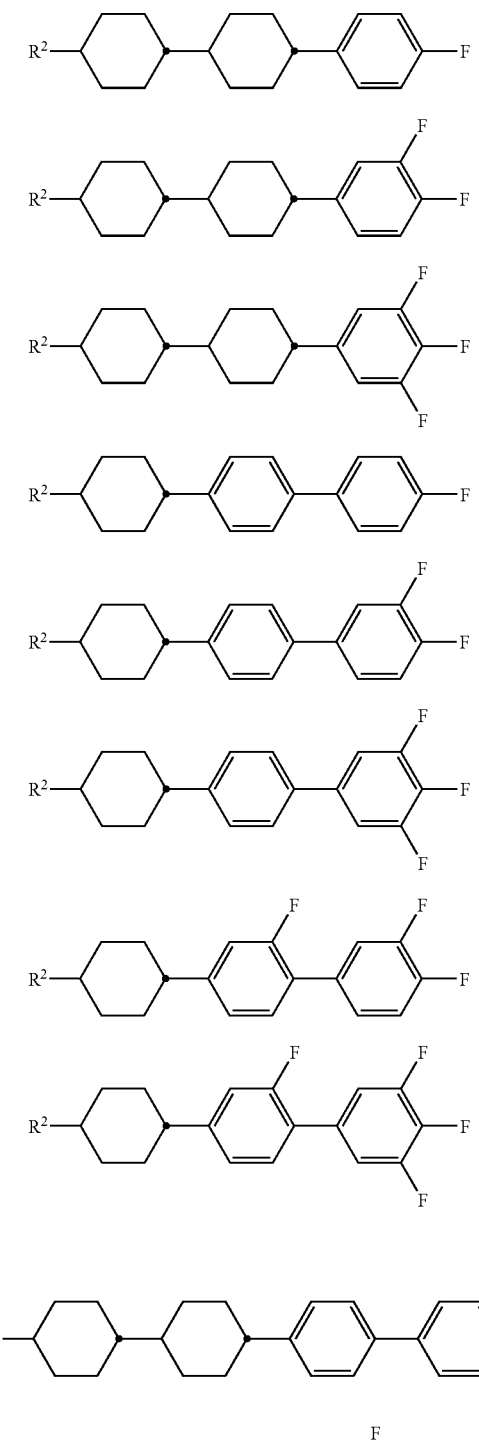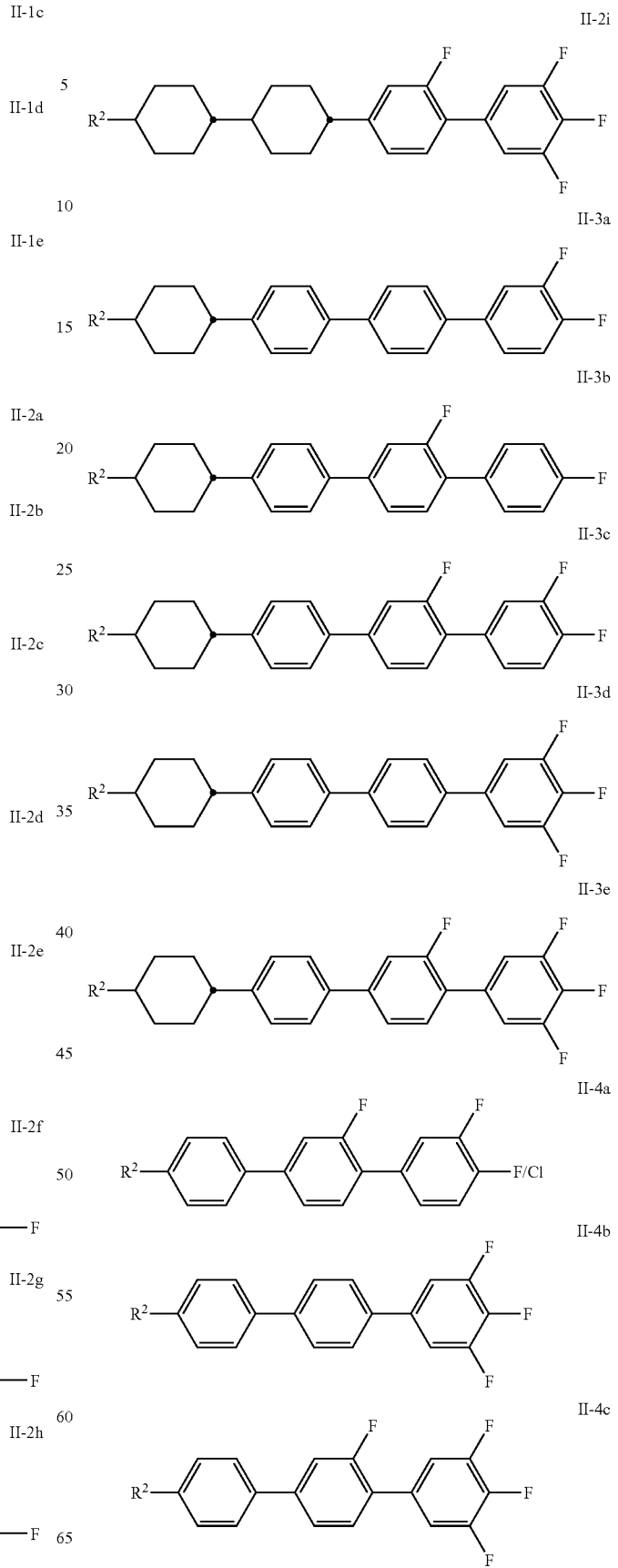

-continued

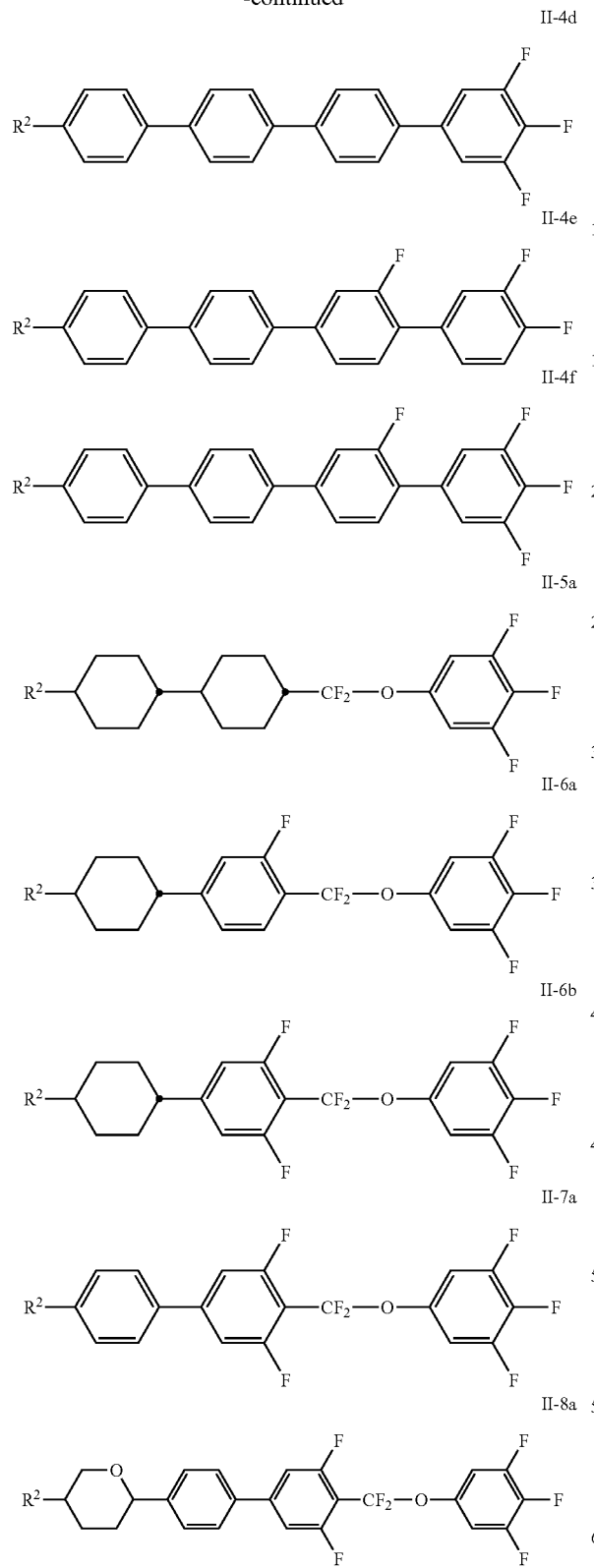

wherein the parameters have the respective meanings given under formula II and its respective sub-formulae above and preferably $R^2$ is alkyl, alkenyl or alkoxy.

Component C of these media preferably comprises one or more compounds of the formula III and particularly preferably consists predominantly and very particularly preferably consists virtually completely of one or more compounds of the formula III.

Very preferred compounds of formula III are compounds selected from the group of the following formulae, formulae III-1-1 to III-3-5

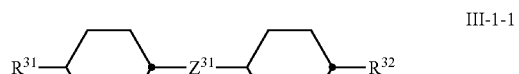

III-1-1

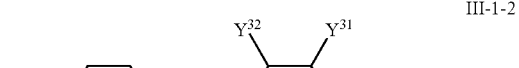

III-1-2

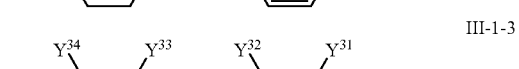

III-1-3

III-2-1

III-2-2

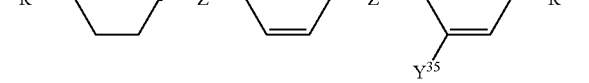

III-2-3

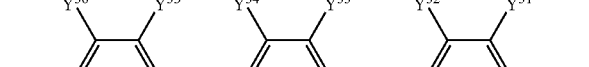

III-3-1

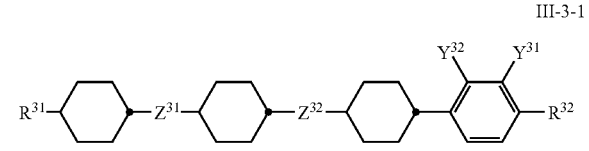

III-3-2

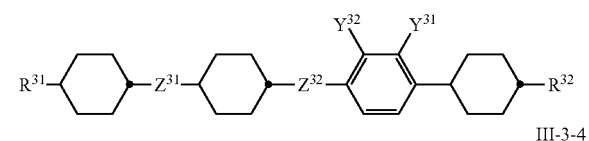

III-3-4

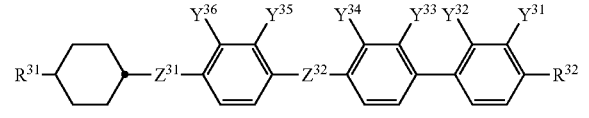

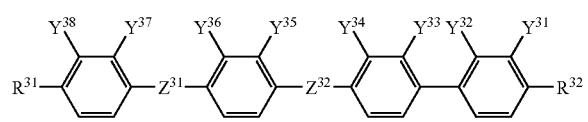
III-3-5 from which compounds of formula I are excluded and wherein the parameters have the respective meanings given under formula III and its respective sub-formulae above and one or more of $Y^{31}$ to $Y^{38}$ are F, and the others H, preferably one or less of $Y^{31}$ to $Y^{38}$, which are present, are F, $R^{31}$ and $R^{32}$ are each, independently of one another, n-alkyl, n-alkoxy, each having from 1 to 7 carbon atoms, or alkenyl, having from 2 to 7 carbon atoms, preferably n-alkyl or alkenyl, more preferably n-alkyl, n-alkoxy, vinyl or 1-E-alkenyl, most preferably $R^{31}$ is n-alkyl or alkenyl and $R^{32}$ is n-alkyl, n-alkoxy, vinyl or 1-E-alkenyl and at most half of the substituents $Y^{31}$ to $Y^{38}$ present in a formula are F, more preferably none, one two or three and most preferably none, one or two, of these substituents are F.

Very preferred compounds of formula III are compounds selected from the group of the following formulae, formulae III-1-1a to III-3-4a

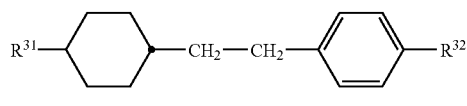
III-1-1a

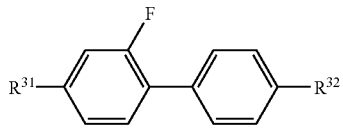
III-1-2a

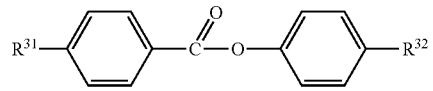
III-1-2b

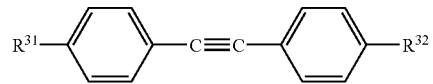
III-1-2c

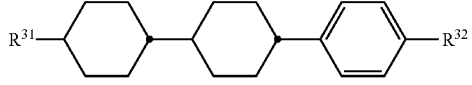
III-2-1a

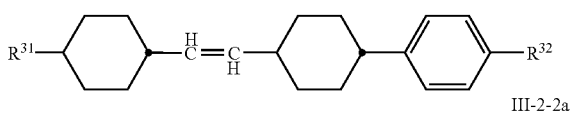
III-2-1b

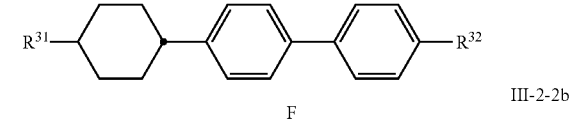
III-2-2a

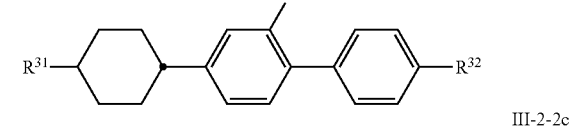
III-2-2b

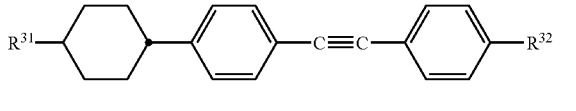
III-2-2c

III-2-2d

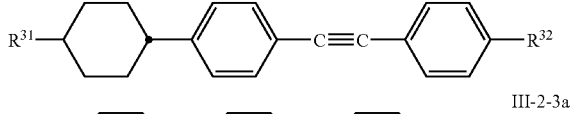
III-2-3a

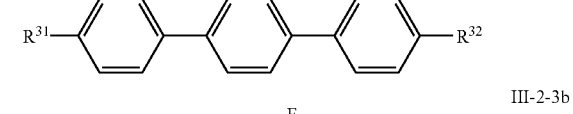
III-2-3b

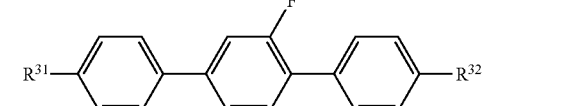
III-2-3c

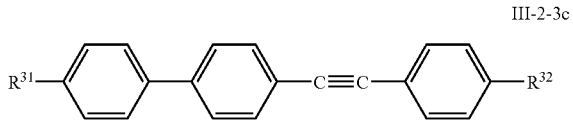
III-2-3d

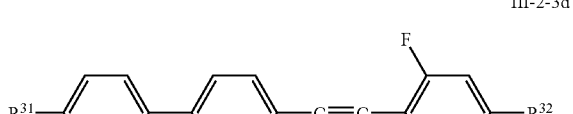
III-3-1a

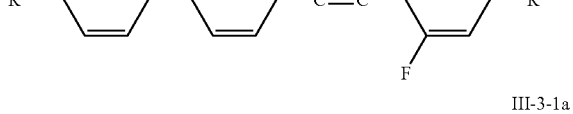
III-3-1b

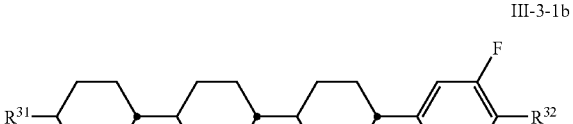
III-3-1c

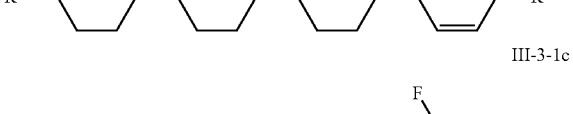
III-3-2a

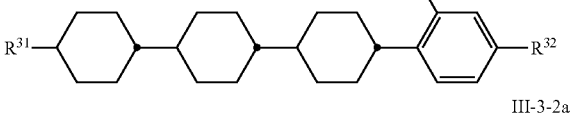
III-3-2b

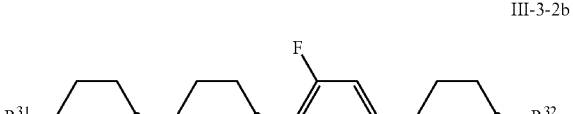
III-3-2c

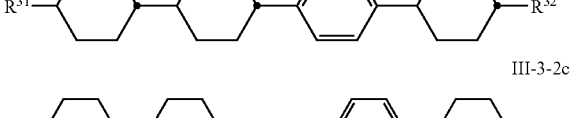
III-3-3a

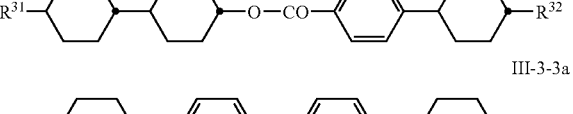

III-3-3b

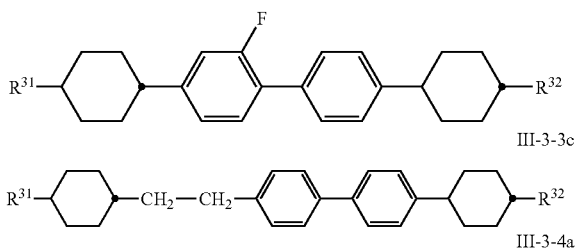

III-3-3c

III-3-4a wherein the parameters have the respective meanings given under formula III and its respective sub-formulae above and in particular preferably
in formula III-1-1a
$R^{31}$ is n-alkyl, or alkenyl and
$R^{32}$ is n-alkyl, alkenyl or n-alkoxy,
in formula III-2-1a
$R^{31}$ is n-alkyl, or alkenyl and
$R^{32}$ is n-alkyl.

Preferably the media used according to the present application comprise one or more compounds of formula I-4, especially preferred compounds selected from the group of formulae I-4a to I-4d, preferably I-4a and I-4b,

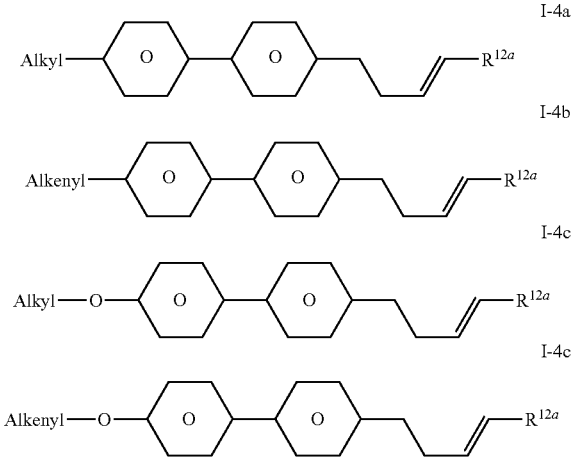

wherein
Alkyl is an alkyl group with 1 to 8 C atoms, in particular methyl,
Alkenyl is an alkenyl group with 2 to 7 C atoms, preferably vinyl or 1E-alkenyl, in particular vinyl or 1E-propenyl, and
$R^{12a}$ is H, methyl, ethyl or n-propyl, in particular methyl.

In a preferred embodiment of the present invention the media used according to the invention preferably comprise one or more compounds selected from the group consisting of the compounds of the formulae I-4a', I-4-b' and
I-4-d', which are sub-formulae of the formula I, I-4a'

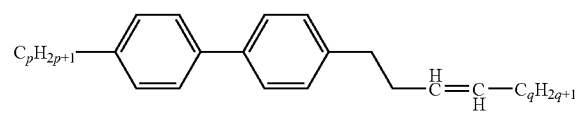

I-4b'

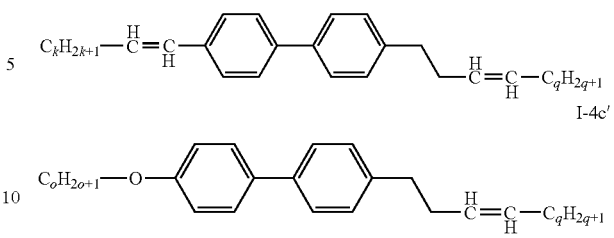

I-4c' wherein
p is an integer from 0 to 10, preferably from 1 to 7, preferably 1 or 2,
q is an integer from 0 to 10, preferably from 0 to 3, preferably 0 or 1,
k is an integer from 0 to 8, preferably from 0 to 4, preferably 0 or 1 and
o is an integer from 1 to 10, preferably from 1 to 5, preferably 1, 2 or 3.

The mesogenic media of negative dielectric anisotropy according to the present invention particularly preferably consist predominantly of components A to C.

The mesogenic medium according to the present invention may comprise further additives and chiral dopants in the usual concentrations. The total concentration of these further constituents is in the range from 0% to 10%, preferably in the range from 0.1% to 6%, based on the entire mixture. The concentrations of the individual compounds of these are in the range from 0.1% to 3%. The concentrations of these compounds and similar constituents of the mixture are not taken into account when specifying the concentration ranges of the other mixture constituents.

The modulation media are obtained in the usual manner from the compounds. The compounds employed in smaller amounts are advantageously dissolved in the compounds employed in larger amounts. If the temperature during the mixing operation is increased above the clearing point of the predominant component, the completeness of the dissolution can easily be observed. However, the media used according to the invention can also be prepared in other ways, for example by using pre-mixtures. Pre-mixtures, which can be employed, are, amongst others, mixtures of homologous compounds and/or eutectic mixtures. However, the pre-mixtures may also already be usable modulation media themselves. This is the case in so-called two-bottle or multi-bottle systems. In the present application, the following applies, unless explicitly stated otherwise.

Dielectrically positive compounds have a $\Delta\epsilon$ of >1.5, dielectrically neutral compounds have a $\Delta\epsilon$ in the range from $-1.5 \le \Delta\epsilon \le 1.5$ and dielectrically negative compounds have a $\Delta\epsilon$ of <-1.5. The same definitions also apply to components of mixtures and to mixtures. The same definition also applies to components and media.

The dielectric anisotropy $\Delta\epsilon$ of the compounds, as well as of those components, which can not be investigated as such, is determined at 1 kHz and 20° C. by extrapolation of the values of a 10% solution of the respective compound in a host mixture to a proportion of the respective compound of 100%. The capacitances of the test mixtures are determined both in a cell having homeotropic edge alignment and in a cell having homogeneous edge alignment. The orientation layers are SE-1211 from Nissan Chemicals, Japan for homeotropic orientation ($\epsilon_\parallel$) and polyimide AL-1054 from Japan Synthetic Rubber, Japan for homogeneous orientation ($\epsilon_\perp$). The layer thickness of the two cell types is about 20 µm. The measurement is carried out using a rectangular wave having a frequency of 1 kHz and an effective voltage (rms, root mean square) of typically from 0.2 V to 1.0 V. However, in every case, the voltage used is lower than the capacitive threshold of the mixture investigated in each case.

For dielectrically positive compounds, the mixture ZLI-4792 is used and for dielectrically neutral and dielectrically negative compounds, the mixture ZLI-3086, both from Merck KGaA, Germany, is used as host mixture.

The term threshold voltage in the present application means the optical threshold and is indicated for a relative contrast of 10% ($V_{10}$). The mid-grey voltage and the saturation voltage are likewise determined optically and indicated for a relative contrast of 50% and 90% respectively. If the capacitive threshold voltage ($V_0$), also known as the Freedericks threshold, is indicated, this is stated explicitly.

In a first preferred embodiment the media used according to the present invention preferably comprise
from 30% up to 60% of a dielectrically neutral component A, preferably comprising, more preferably consisting predominantly of and most preferably consisting virtually completely of one or more dielectrically neutral compounds of formula I,
from 20% to 50% of a dielectrically positive component, component B, preferably comprising, more preferably consisting predominantly of and most preferably consisting virtually completely of one or more with negative dielectric anisotropy of formula II and
optionally, preferably obligatorily, from 10% to 40% of a second dielectrically neutral component, component C preferably comprising, more preferably consisting predominantly of and most preferably consisting virtually completely of formula III.

In this first preferred embodiment the media used according to the present invention preferably have a dielectric anisotropy in the range from 4 to 7.

In a second preferred embodiment the media used according to the present invention preferably comprise
from 10% up to 20% of a dielectrically neutral component A, preferably comprising, more preferably consisting predominantly of and most preferably consisting virtually completely of one or more dielectrically neutral compounds of formula I,
from 40% to 80% of a dielectrically positive component, component B, preferably comprising, more preferably consisting predominantly of and most preferably consisting virtually completely of one or more with negative dielectric anisotropy of formula II and
optionally, preferably obligatorily from 10% to 45% of a second dielectrically neutral component, component C preferably comprising, more preferably consisting predominantly of and most preferably consisting virtually completely of formula III.

In this second preferred embodiment the media used according to the present invention preferably have a dielectric anisotropy of 7 or more.

The indicated ranges of values preferably include the limit values.

Throughout this application the following definitions and conditions apply, unless explicitly stated otherwise. The concentrations are given in % by weight and are based on the complete mixture. Temperatures are indicated in degrees Celsius (° C.) and temperature differences in differential degrees Celsius (°). All physical properties are determined as described in "Merck Liquid Crystals, Physical Properties of Liquid Crystals", Version of November 1997, Merck KGaA, Germany, and are indicated for a temperature of 20° C. The optical anisotropy (Δn), also known as the birefringence, is determined at a wavelength of 589.3 nm. The dielectric anisotropy (Δ∈) is determined at a frequency of 1 kHz. The physical properties of two reference materials, i.e. the host mixture ZLI-4792, which has already been mentioned above, and of the well known mixture ZLI-2293, which is also available from Merck KGaA, Germany, are given in the following table.

Table of reference values of physical properties

| Physical Properties | Mixture ZLI-2293 Values | ZLI-4792 |
|---|---|---|
| T(NI)/° C. = | 85 | 92.5 |
| $n_e$ (20° C., 589 nm) = | 1.631 | 1.576 |
| Δn (20° C., 589 nm) = | 0.132 | 0.097 |
| $\epsilon_\parallel$ (20° C., 1 kHz) = | 14.0 | 8.4 |
| Δ∈ (20° C., 1 kHz) = | +10.0 | +5.3 |
| $k_1$ (20° C.)/pN = | 12.5 | 13.2 |
| $k_2$ (20° C.)/pN = | 6.5 | 7.3 |
| $k_3$ (20° C.)/pN = | 17.9 | 19.9 |
| $k_3/k_1$ (20° C.) = | 1.43 | 1.50 |
| $\gamma_1$ (20° C.)/mPa · s = | 162 | 133 |
| $V_0$ (20° C.)/V = | 1.66 | 1.19 |

In a list of possible alternatives, where only the plural is indicated, this also means the singular.

In connection with details on the composition of the media or their components,
"comprise" means that the concentration of the respective material mentioned, i.e. of the component or of the compound, in the reference unit, i.e. the medium or the component, is preferably 10% or more, particularly preferably 20% or more and very particularly preferably 30% or more,
"consist predominantly of" means that the concentration of the said material in the reference unit is preferably 50% or more, particularly preferably 60% or more and very particularly preferably 70% or more, and
"consist virtually completely of" means that the concentration of the said material in the reference unit is preferably 80% or more, particularly preferably 90% or more and very particularly preferably 95% or more.

The dielectric properties, electro-optical properties (for example the threshold voltages) and the response times were determined in test cells produced at Merck KGaA, Darmstadt, Germany. The test cells for the determination of Δ∈ had a layer thickness of 22 μm and a circular electrode of indium tin oxide (ITO) having an area of 1.13 cm² and a protective conducting ring. For homeotropic alignment for the determination of $\epsilon_\parallel$ cells having a homeotropically aligning polyimide alignment layer were used. Alternatively, lecithin (Merck KGaA) can be used as alignment agent. The cells for the determination of $\epsilon_\perp$ had alignment layers of the polyimide AL-3046 from Japan Synthetic Rubber, Japan. The capacitances were measured using a HP 4274A LCR Meter of Hewlett Packard, USA with a rectangular wave and an effective voltage of generally 0.3 $V_{rms}$. The electro-optical investigations were carried out with white light. The characteristic voltages were determined with perpendicular observation.

In the present application, high-frequency technology and ultrahigh-frequency technology denote applications with frequencies in the range from 1 MHz to 1 THz, preferably from 0.1 GHz to 500 GHz, preferably from 2 GHz to 300 GHz, particularly preferably from about 5 GHz to 150 GHz.

The modulation media used in the modulation elements for electromagnetic radiation according to the present invention preferably exhibit a cybotactic phase, which at a certain temperature is converted into a nematic phase. The modulation elements for electromagnetic radiation according to the present invention preferably are operated at a temperature in the range of 0° to 10°, preferably of 0.1° to 5°, preferably of 0.1° to 2° and most preferably of 0.1° to 1° above the temperature of the transition of the respective modulation medium from the cybotactic phase to the nematic phase.

The modulation media used in the modulation elements for electromagnetic radiation according to the present invention preferably have an elastic constant $k_1$ at the operation temperature or at least at one of the operation temperatures of the modulation elements of 18 pN or more, preferably of 20 pN or more and most preferably of 25 pN or more.

The modulation media used in the modulation elements for electromagnetic radiation according to the present invention preferably have an elastic constant $k_3$ at the operation temperature or at least at one of the operation temperatures of the modulation elements of 100 pN or more, preferably of 200 pN or more and most preferably of 500 pN or more.

The following examples illustrate the present invention without limiting it in any way. They, however, illustrate typical realizable properties as well as the combinations thereof.

All temperatures, like e.g. the melting point: T(C,N), the transition temperature from the smectic (S) to the nematic (N) phase: T(S,N), the transition temperature from the cybotactic (Y) to the nematic (N) phase: T(Y,N) and the clearing point T(N,I) are given in degrees Celsius (° C.), temperature differences are given in degrees centigrade (°).

For the present invention and especially in the following examples the structures of the mesogenic compounds are given by abbreviations, also called acronyms. In these acronyms the chemical formulae are abbreviated as follows using the following tables A to C. All groups $C_nH_{2n+1}$, $C_mH_{2m+1}$ and $C_lH_{2l+1}$ respectively $C_nH_{2n-1}$, $C_mH_{2m-1}$ and $C_lH_{2l-1}$ are straight chain alkyl respectively alkenyl, preferably 1E-alkenyl, each with n, m respectively l C-atoms. The codes used for the ring elements of the core structures of the compounds are listed in table A, whereas table B shows the linking groups. Table C lists the meanings of the codes end groups on the left hand side, respectively on the right hand side of the molecules. Table D compiles exemplary structures of compounds together with their respective abbreviations.

TABLE A

| Ring Elements | |
|---|---|
| C | |
| L | |
| L1 | |
| D | |
| D1 | |
| A | |
| A1 | |
| P | |
| G | |
| G1 | |
| U | |
| U1 | |
| Y | |
| M | |
| M1 | |
| N | |

TABLE A-continued

| Ring Elements | |
|---|---|
| Nl | 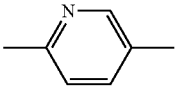 |
| Np | 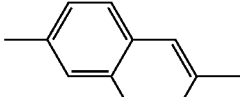 |
| tH | 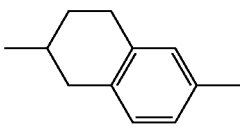 |
| dH | 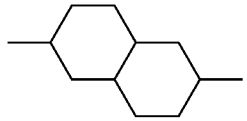 |

TABLE B

| Linking Groups | | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | T | —C≡C— |

TABLE C

| End Groups | | | |
|---|---|---|---|
| Left hand side, | | Right hand side, | |
| used singly | | | |
| -n- | C$_n$H$_{2n+1}$— | -n | —C$_n$H$_{2n+1}$ |
| -nO- | C$_n$H$_{2n+1}$O— | -nO | —OC$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |
| used in combination | | | |
| -...A...- | —C≡C— | -...A... | —C≡C— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | wherein n and m each are integers and the three dots "..." are spacers for other abbreviations of from this table.

In the following table exemplary structures are given together with their respective abbreviations. These are shown to illustrate the meaning of the rules for the abbreviations. Further they illustrate compounds, which are preferably used.

TABLE D

Exemplary Structures

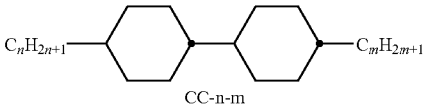

CC-n-m

TABLE D-continued

Exemplary Structures

C$_n$H$_{2n+1}$—[Cy]—[Cy]—O—C$_m$H$_{2m+1}$
CC-n-Om

C$_n$H$_{2n+1}$—[Cy]—[Cy]—CH=CH$_2$
CC-n-V

C$_n$H$_{2n+1}$—[Cy]—[Cy]—CH=CH—C$_m$H$_{2m+1}$
CC-n-Vm

C$_n$H$_{2n+1}$—[Cy]—[Cy]—(CH$_2$)$_m$—CH=CH$_2$
CC-n-mV

C$_n$H$_{2n+1}$—[Cy]—[Cy]—(CH$_2$)$_m$—CH=CH—C$_l$H$_{2l+1}$
CC-n-mVl

H$_2$C=CH—[Cy]—[Cy]—CH=CH$_2$
CC-V-V

CH$_2$=CH—[Cy]—[Cy]—(CH$_2$)$_m$—CH=CH$_2$
CC-V-mV

CH$_2$=CH—[Cy]—[Cy]—CH=CH—C$_m$H$_{2m+1}$
CC-V-Vm

CH$_2$=CH—(CH$_2$)$_n$—[Cy]—[Cy]—(CH$_2$)$_m$—CH=CH$_2$
CC-Vn-mV

C$_n$H$_{2n+1}$—CH=CH—[Cy]—[Cy]—(CH$_2$)$_m$—CH=CH$_2$
CC-nV-mV

C$_n$H$_{2n+1}$—CH=CH—[Cy]—[Cy]—CH=CH—C$_m$H$_{2m+1}$
CC-nV-Vm

C$_n$H$_{2n+1}$—[Cy]—[Ph]—C$_m$H$_{2m+1}$
CP-n-m

C$_n$H$_{2n+1}$O—[Cy]—[Ph]—C$_m$H$_{2m+1}$
CP-nO-m

TABLE D-continued
Exemplary Structures
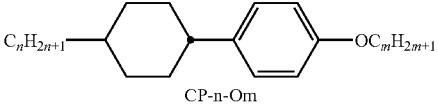
CP-n-Om
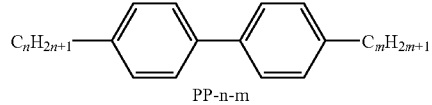
PP-n-m
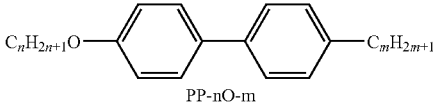
PP-nO-m
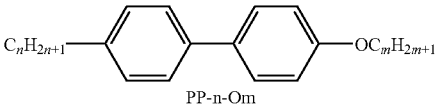
PP-n-Om
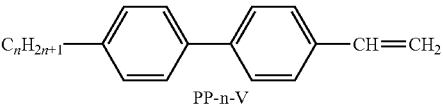
PP-n-V
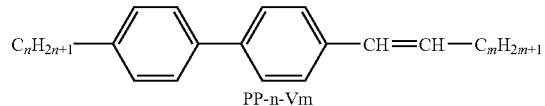
PP-n-Vm
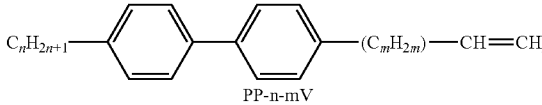
PP-n-mV
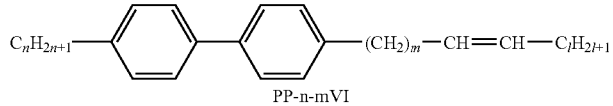
PP-n-mVl
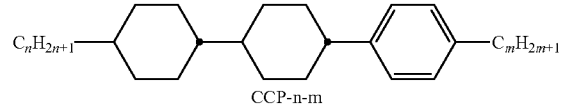
CCP-n-m
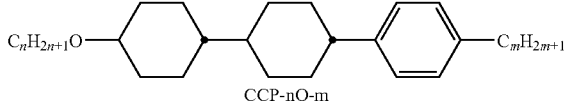
CCP-nO-m
CCP-n-Om
CCP-n-V
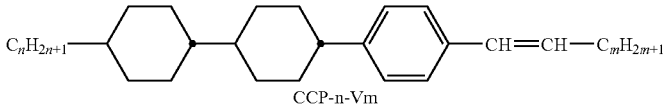
CCP-n-Vm TABLE D-continued Exemplary Structures $C_nH_{2n+1}$—[Cy]—[Cy]—[Ph]—$(C_mH_{2m})$—CH=CH$_2$
CCP-n-mV $C_nH_{2n+1}$—[Cy]—[Cy]—[Ph]—$(C_mH_{2m})$—CH=CH—$C_lH_{2l+1}$
CCP-n-mVI H$_2$C=CH—[Cy]—[Cy]—[Ph]—$C_mH_{2m+1}$
CCP-V-m $C_nH_{2n+1}$—CH=CH—[Cy]—[Cy]—[Ph]—$C_mH_{2m+1}$
CCP-nV-m CH$_2$=CH—$(CH_2)_n$—[Cy]—[Cy]—[Ph]—$C_mH_{2m+1}$
CCP-Vn-m $C_nH_{2n+1}$—CH=CH—$(CH_2)_m$—[Cy]—[Cy]—[Ph]—$C_lH_{2l+1}$
CCP-nVm-I $C_nH_{2n+1}$—[Cy]—[Ph]—[Ph]—$C_mH_{2m+1}$
CPP-n-m $C_nH_{2n+1}$O—[Cy]—[Ph]—[Ph]—$C_mH_{2m+1}$
CPP-nO-m $C_nH_{2n+1}$—[Cy]—[Ph]—[Ph]—O$C_mH_{2m+1}$
CPP-n-Om H$_2$C=CH—[Cy]—[Ph]—[Ph]—$C_mH_{2m+1}$
CPP-V-m $C_nH_{2n+1}$—CH=CH—[Cy]—[Ph]—[Ph]—$C_mH_{2m+1}$
CPP-nV-m CH$_2$=CH—$(C_nH_{2n})$—[Cy]—[Ph]—[Ph]—$C_mH_{2m+1}$
CPP-Vn-m $C_nH_{2n+1}$—CH=CH—$(C_mH_{2m})$—[Cy]—[Ph]—[Ph]—$C_lH_{2l+1}$
CPP-nVm-I TABLE D-continued
Exemplary Structures
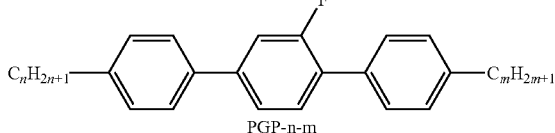
PGP-n-m
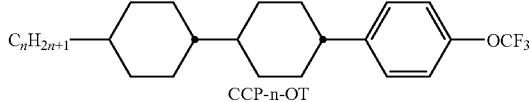
CCP-n-OT
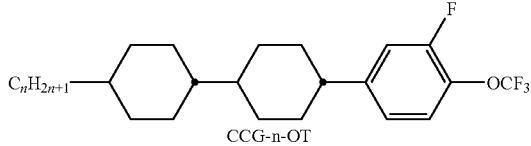
CCG-n-OT
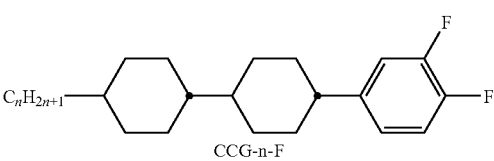
CCG-n-F
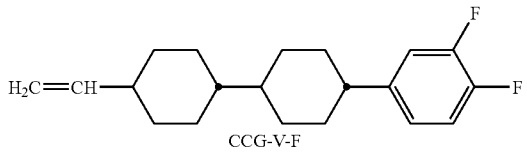
CCG-V-F
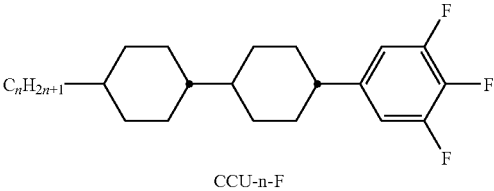
CCU-n-F
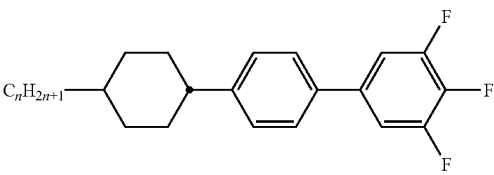
CPU-n-F
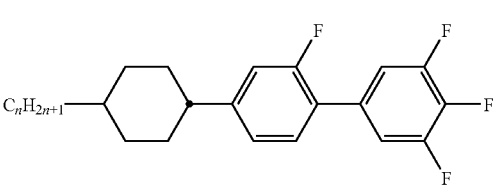
CGU-n-F
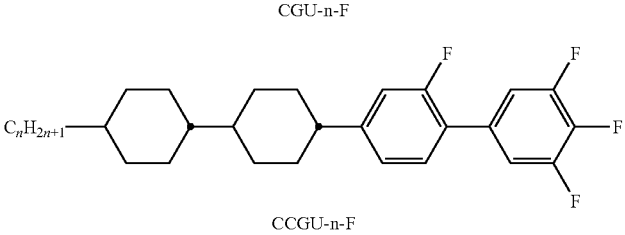
CCGU-n-F

TABLE D-continued
Exemplary Structures
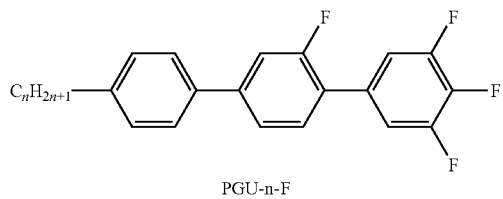
PGU-n-F
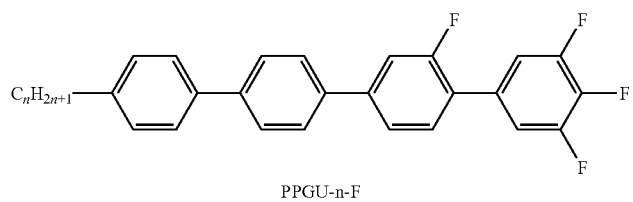
PPGU-n-F
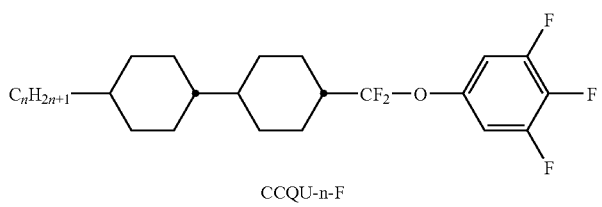
CCQU-n-F
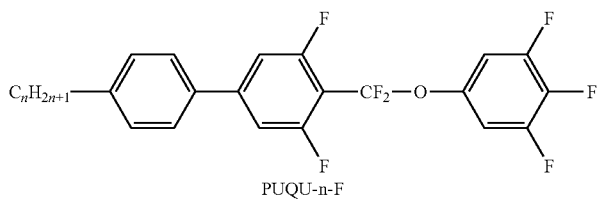
PUQU-n-F
In the following table, Table E, exemplary compounds are compiled, which may be used to as stabiliser in the mesogenic media used according to the present invention.
TABLE E
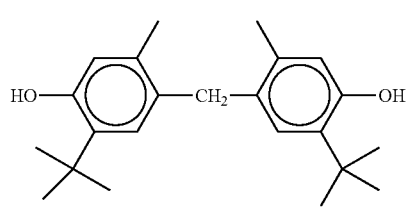
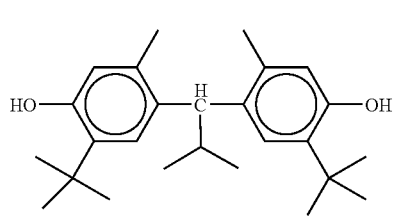
TABLE E-continued
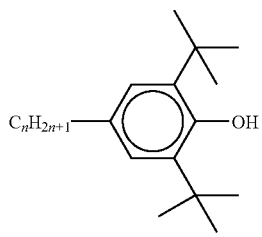
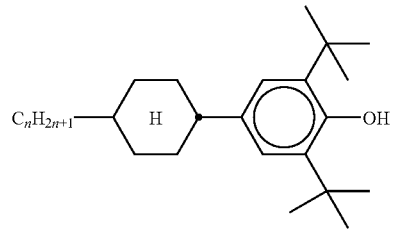

TABLE E-continued
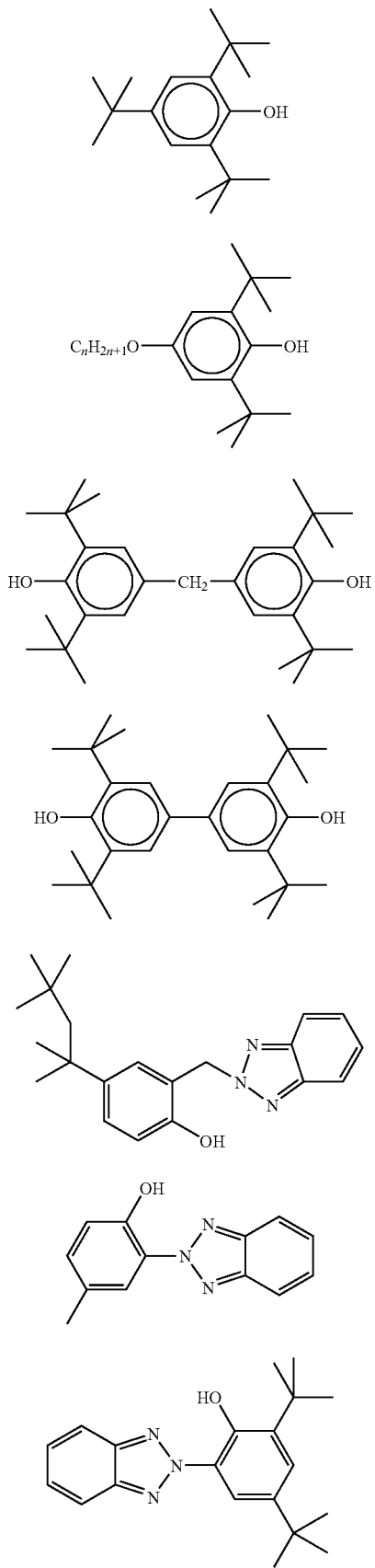
TABLE E-continued
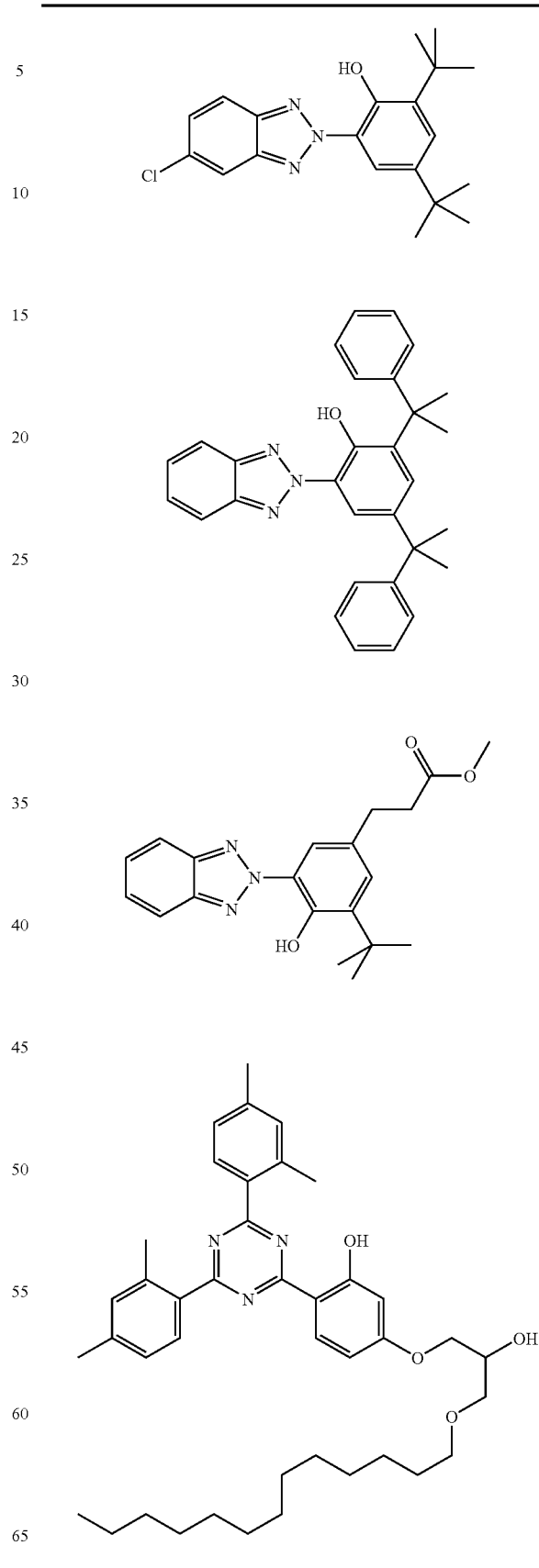

TABLE E-continued
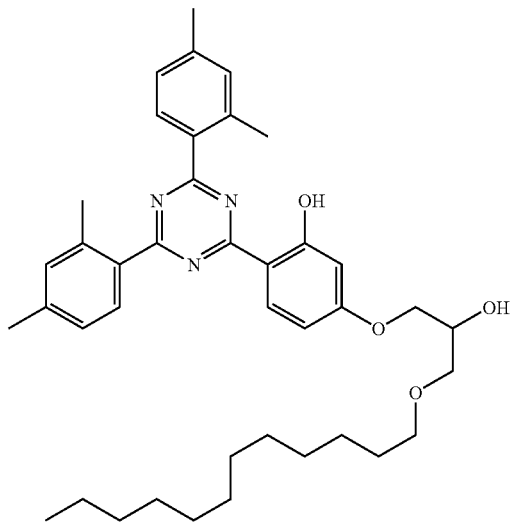 [SMILES: CCCCCCCCCCCCOCC(O)COc1ccc(-c2nc(-c3ccc(C)cc3C)nc(-c3ccc(C)cc3C)n2)c(O)c1]
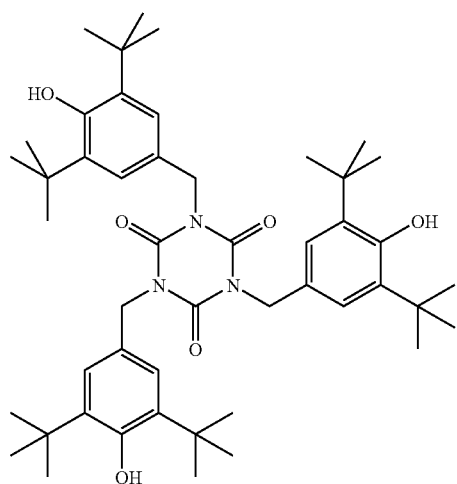 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
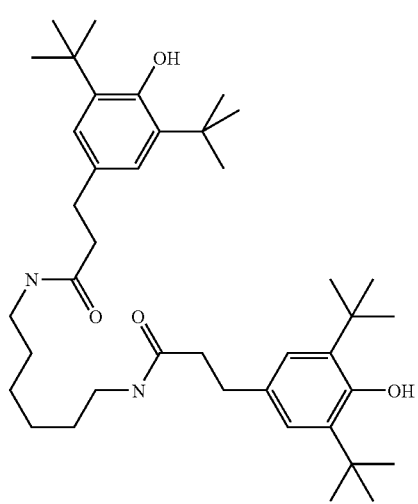 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
TABLE E-continued
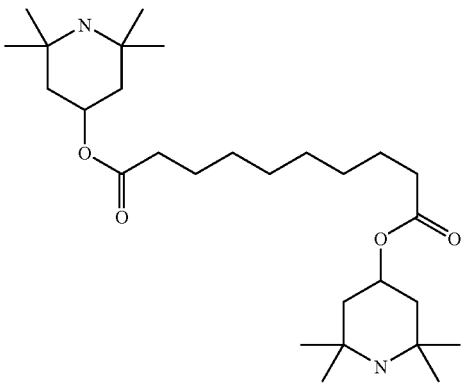
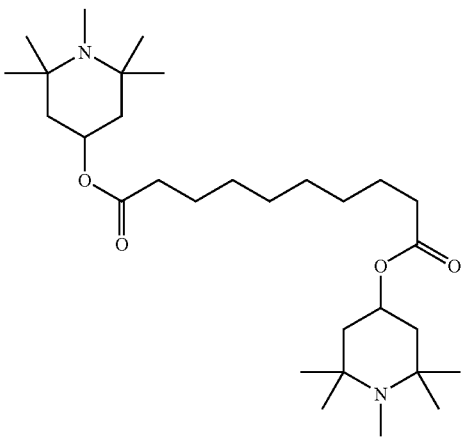
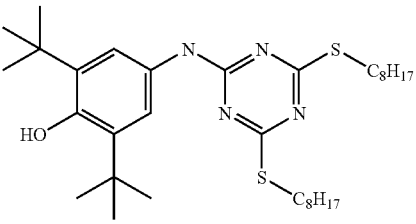
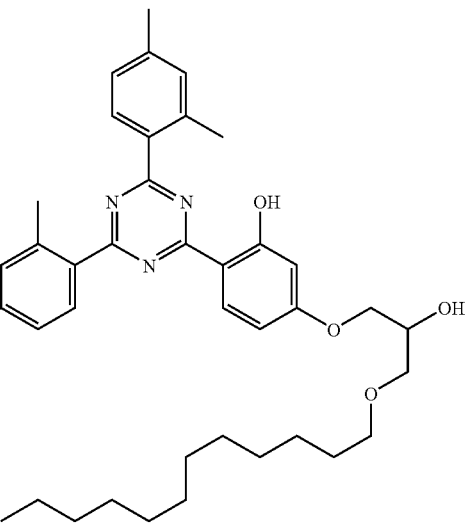
In a preferred embodiment of the present invention the mesogenic media comprise one or more compounds selected from the group of compounds of Table E In the following table, Table F, exemplary compounds are compiled, which may be preferably used to as chiral dopants in the mesogenic media used according to the present invention.
TABLE F
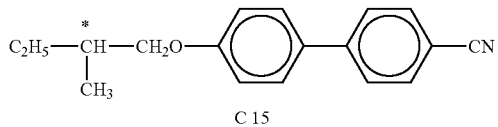
C 15
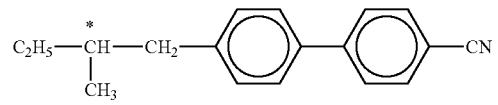
CB 15
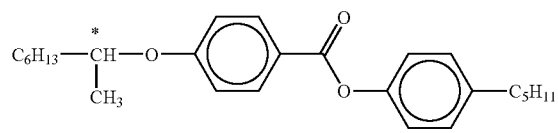
CM 21
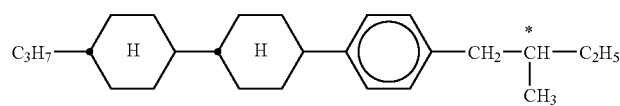
CM 44
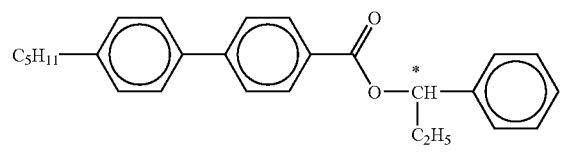
CM 45
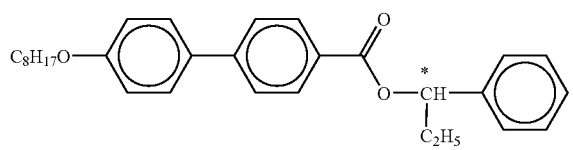
CM 47
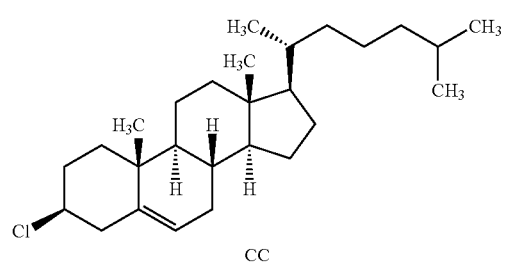
CC TABLE F-continued

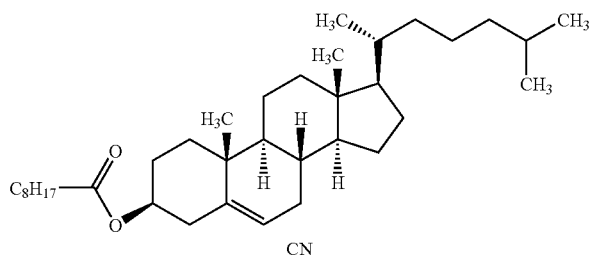

In a preferred embodiment of the present invention the mesogenic media comprise one or more compounds selected from the group of compounds of Table F.

The mesogenic media in accordance with the present application preferably comprise two or more, preferably four or more, compounds selected from the group consisting of the compounds of the tables above.

EXAMPLES

The examples described below illustrate the present invention without restricting it in any way. They furthermore indicate to the person skilled in the art the properties and in particular the property combinations that can be achieved by means of the present invention.

Example 1

A test cell for the determination of the elastic constants $k_1$ and $k_3$ via measurement of the response of the dielectric permittivity on an applied voltage comprising a liquid-crystal mixture of the following composition is prepared and investigated.

| Composition Compound | | |
|---|---|---|
| No. | Abbreviation | Conc. |
| 1 | CCP-3-OT | 15.0 |
| 2 | CCU-3-F | 14.0 |
| 3 | CCQU-3-F | 7.0 |
| 4 | PUQU-3-F | 5.0 |
| 5 | PP-1-2V1 | 17.0 |
| 6 | PGP-2-3 | 5.0 |
| 7 | PGP-2-4 | 5.0 |
| 8 | CC-3-V1 | 13.0 |
| 9 | CC-4-V | 19.0 |
| Σ | | 100.0 |

| Physical Properties | |
|---|---|
| T(N, I) = | 75.0° C. |
| T(S, N) < | 20° C. |
| $n_e$ (20° C., 589 nm) = | 1.601 |
| Δn (20° C., 589 nm) = | 0.116 |
| $\varepsilon_\perp$ (20° C., 1 kHz) = | 7.6 |
| Δε (20° C., 1 kHz) = | +4.9 |
| $k_1$ (20° C.) = | 22.6 pN |
| $k_3$ (20° C.) = | 498 pN |
| $k_3/k_1$ (20° C.) = | 22.0 |
| $\gamma_1$ (20° C.) = | 58 mPa·s |
| $V_0$ (20° C.) = | 2.27 V |

This mixture is investigated in the cell by measuring first with stepwise increasing voltage (Called "up") from 0.2 to 20. V and then with stepwise decreasing voltage (called "down") from 20.0 to 0.2 V. It shows a response with two clearly distinct transitions. The second of these transitions has a pronounced hystersis. This is illustrated in the following table.

| | Voltage Meas. Direction | | | |
|---|---|---|---|---|
| | Up | | Down | |
| No. | Voltage/V | Capacitance/pF | Voltage/V | Capacitance/pF |
| 1 | 0.200 | 124.14 | 20.033 | 305.25 |
| 2 | 0.209 | 124.20 | 19.938 | 305.36 |
| 3 | 0.221 | 124.20 | 19.838 | 305.35 |
| 4 | 0.231 | 124.21 | 19.741 | 305.32 |
| 5 | 0.241 | 124.22 | 19.644 | 305.28 |
| 6 | 0.251 | 124.21 | 19.549 | 305.20 |
| 7 | 0.261 | 124.21 | 19.448 | 305.12 |
| 8 | 0.271 | 124.20 | 19.351 | 305.17 |
| 9 | 0.281 | 124.20 | 19.253 | 305.11 |
| 10 | 0.291 | 124.20 | 19.158 | 304.98 |
| 11 | 0.301 | 124.21 | 19.059 | 304.88 |
| 12 | 0.311 | 124.20 | 18.962 | 304.72 |
| 13 | 0.321 | 124.20 | 18.865 | 304.67 |
| 14 | 0.331 | 124.20 | 18.771 | 304.56 |
| 15 | 0.341 | 124.20 | 18.674 | 304.47 |
| 16 | 0.351 | 124.20 | 18.478 | 304.23 |
| 17 | 0.361 | 124.21 | 18.382 | 304.12 |
| 18 | 0.370 | 124.20 | 18.282 | 303.96 |
| 19 | 0.380 | 124.19 | 18.185 | 303.92 |
| 20 | 0.390 | 124.18 | 18.087 | 303.79 |
| 21 | 0.400 | 124.18 | 17.991 | 303.80 |
| 22 | 0.410 | 124.19 | 17.890 | 303.63 |
| 23 | 0.420 | 124.19 | 17.793 | 303.54 |
| 24 | 0.430 | 124.19 | 17.695 | 303.39 |
| 25 | 0.440 | 124.18 | 17.599 | 303.22 |
| 26 | 0.450 | 124.17 | 17.499 | 303.22 |
| 27 | 0.460 | 124.19 | 17.403 | 303.14 |
| 28 | 0.470 | 124.19 | 17.305 | 302.95 |
| 29 | 0.480 | 124.19 | 17.210 | 302.82 |
| 30 | 0.490 | 124.18 | 17.108 | 302.70 |
| 31 | 0.500 | 124.18 | 17.010 | 302.55 |
| 32 | 0.513 | 124.20 | 16.912 | 302.51 |

-continued

| | Voltage Meas. Direction | | | |
|---|---|---|---|---|
| | Up | | Down | |
| No. | Voltage/V | Capacitance/pF | Voltage/V | Capacitance/pF |
| 33 | 0.523 | 124.21 | 16.815 | 302.35 |
| 34 | 0.533 | 124.21 | 16.716 | 302.22 |
| 35 | 0.543 | 124.20 | 16.619 | 302.11 |
| 36 | 0.552 | 124.20 | 16.522 | 301.99 |
| 37 | 0.563 | 124.21 | 16.426 | 301.84 |
| 38 | 0.572 | 124.20 | 16.325 | 301.76 |
| 39 | 0.582 | 124.23 | 16.228 | 301.61 |
| 40 | 0.592 | 124.22 | 16.130 | 301.46 |
| 41 | 0.602 | 124.21 | 16.034 | 301.29 |
| 42 | 0.612 | 124.20 | 15.935 | 301.16 |
| 43 | 0.622 | 124.20 | 15.839 | 301.07 |
| 44 | 0.632 | 124.20 | 15.742 | 300.94 |
| 45 | 0.642 | 124.20 | 15.646 | 300.78 |
| 46 | 0.652 | 124.20 | 15.549 | 300.60 |
| 47 | 0.662 | 124.20 | 15.451 | 300.44 |
| 48 | 0.672 | 124.19 | 15.353 | 300.25 |
| 49 | 0.682 | 124.19 | 15.256 | 300.16 |
| 50 | 0.691 | 124.19 | 15.157 | 300.01 |
| 51 | 0.701 | 124.19 | 15.059 | 299.87 |
| 52 | 0.711 | 124.20 | 14.962 | 299.74 |
| 53 | 0.721 | 124.20 | 14.866 | 299.65 |
| 54 | 0.731 | 124.19 | 14.765 | 299.46 |
| 55 | 0.741 | 124.19 | 14.668 | 299.27 |
| 56 | 0.751 | 124.19 | 14.570 | 299.06 |
| 57 | 0.761 | 124.20 | 14.374 | 298.76 |
| 58 | 0.771 | 124.19 | 14.277 | 298.66 |
| 59 | 0.781 | 124.20 | 14.180 | 298.46 |
| 60 | 0.791 | 124.20 | 14.084 | 298.27 |
| 61 | 0.801 | 124.18 | 13.982 | 298.04 |
| 62 | 0.811 | 124.21 | 13.885 | 297.91 |
| 63 | 0.821 | 124.20 | 13.787 | 297.78 |
| 64 | 0.831 | 124.19 | 13.690 | 297.44 |
| 65 | 0.841 | 124.19 | 13.591 | 297.38 |
| 66 | 0.851 | 124.20 | 13.494 | 296.96 |
| 67 | 0.861 | 124.20 | 13.396 | 297.00 |
| 68 | 0.870 | 124.20 | 13.300 | 296.79 |
| 69 | 0.881 | 124.20 | 13.200 | 296.45 |
| 70 | 0.890 | 124.20 | 13.102 | 296.23 |
| 71 | 0.900 | 124.20 | 13.005 | 295.99 |
| 72 | 0.910 | 124.20 | 12.908 | 295.76 |
| 73 | 0.920 | 124.20 | 12.810 | 295.68 |
| 74 | 0.930 | 124.20 | 12.713 | 295.37 |
| 75 | 0.940 | 124.20 | 12.615 | 295.11 |
| 76 | 0.950 | 124.20 | 12.519 | 294.82 |
| 77 | 0.960 | 124.20 | 12.428 | 294.85 |
| 78 | 0.970 | 124.19 | 12.330 | 294.45 |
| 79 | 0.980 | 124.20 | 12.232 | 294.25 |
| 80 | 0.990 | 124.19 | 12.135 | 294.10 |
| 81 | 1.000 | 124.18 | 12.035 | 293.87 |
| 82 | 1.016 | 124.21 | 11.938 | 293.55 |
| 83 | 1.026 | 124.22 | 11.840 | 293.29 |
| 84 | 1.036 | 124.23 | 11.744 | 293.11 |
| 85 | 1.046 | 124.23 | 11.643 | 292.78 |
| 86 | 1.056 | 124.23 | 11.546 | 292.37 |
| 87 | 1.066 | 124.22 | 11.448 | 291.85 |
| 88 | 1.076 | 124.22 | 11.351 | 291.80 |
| 89 | 1.086 | 124.23 | 11.252 | 291.50 |
| 90 | 1.096 | 124.23 | 11.155 | 291.19 |
| 91 | 1.106 | 124.23 | 11.057 | 290.77 |
| 92 | 1.116 | 124.23 | 10.961 | 290.57 |
| 93 | 1.126 | 124.22 | 10.860 | 290.13 |
| 94 | 1.136 | 124.22 | 10.762 | 289.89 |
| 95 | 1.146 | 124.22 | 10.664 | 289.43 |
| 96 | 1.156 | 124.22 | 10.567 | 289.14 |
| 97 | 1.165 | 124.23 | 10.468 | 288.43 |
| 98 | 1.175 | 124.23 | 10.273 | 287.92 |
| 99 | 1.185 | 124.22 | 10.176 | 287.68 |
| 100 | 1.196 | 124.22 | 10.076 | 287.25 |
| 101 | 1.205 | 124.21 | 10.014 | 286.65 |
| 102 | 1.215 | 124.23 | 9.916 | 286.49 |
| 103 | 1.225 | 124.23 | 9.819 | 285.90 |
| 104 | 1.235 | 124.24 | 9.721 | 285.60 |
| 105 | 1.245 | 124.23 | 9.624 | 284.92 |
| 106 | 1.255 | 124.22 | 9.526 | 284.49 |
| 107 | 1.265 | 124.22 | 9.430 | 284.14 |
| 108 | 1.275 | 124.22 | 9.334 | 283.56 |
| 109 | 1.284 | 124.23 | 9.188 | 283.01 |
| 110 | 1.294 | 124.22 | 9.089 | 282.48 |
| 111 | 1.304 | 124.22 | 8.992 | 281.84 |
| 112 | 1.314 | 124.21 | 8.893 | 280.81 |
| 113 | 1.324 | 124.22 | 8.796 | 279.98 |
| 114 | 1.334 | 124.22 | 8.698 | 279.57 |
| 115 | 1.344 | 124.22 | 8.601 | 278.55 |
| 116 | 1.354 | 124.23 | 8.501 | 278.00 |
| 117 | 1.364 | 124.23 | 8.404 | 277.32 |
| 118 | 1.374 | 124.22 | 8.306 | 276.27 |
| 119 | 1.384 | 124.22 | 8.209 | 275.44 |
| 120 | 1.394 | 124.22 | 8.110 | 273.96 |
| 121 | 1.404 | 124.23 | 8.013 | 273.14 |
| 122 | 1.414 | 124.24 | 7.916 | 272.21 |
| 123 | 1.424 | 124.23 | 7.819 | 270.56 |
| 124 | 1.434 | 124.23 | 7.722 | 269.12 |
| 125 | 1.444 | 124.22 | 7.625 | 267.24 |
| 126 | 1.454 | 124.22 | 7.526 | 265.75 |
| 127 | 1.464 | 124.22 | 7.429 | 263.32 |
| 128 | 1.474 | 124.23 | 7.330 | 261.44 |
| 129 | 1.483 | 124.23 | 7.184 | 252.92 |
| 130 | 1.493 | 124.23 | 7.087 | 203.48 |
| 131 | 1.503 | 124.22 | 6.988 | 194.65 |
| 132 | 1.514 | 124.22 | 6.890 | 192.61 |
| 133 | 1.523 | 124.22 | 6.792 | 190.30 |
| 134 | 1.533 | 124.23 | 6.695 | 186.28 |
| 135 | 1.543 | 124.23 | 6.597 | 184.17 |
| 136 | 1.553 | 124.22 | 6.499 | 181.62 |
| 137 | 1.563 | 124.22 | 6.402 | 179.72 |
| 138 | 1.573 | 124.23 | 6.305 | 178.05 |
| 139 | 1.583 | 124.23 | 6.211 | 175.50 |
| 140 | 1.593 | 124.23 | 6.113 | 174.73 |
| 141 | 1.603 | 124.23 | 6.015 | 174.10 |
| 142 | 1.613 | 124.21 | 5.917 | 172.87 |
| 143 | 1.622 | 124.23 | 5.819 | 171.82 |
| 144 | 1.633 | 124.23 | 5.721 | 171.15 |
| 145 | 1.642 | 124.24 | 5.623 | 170.20 |
| 146 | 1.652 | 124.24 | 5.526 | 169.24 |
| 147 | 1.662 | 124.23 | 5.427 | 168.20 |
| 148 | 1.672 | 124.24 | 5.329 | 167.33 |
| 149 | 1.682 | 124.22 | 5.231 | 166.41 |
| 150 | 1.692 | 124.23 | 5.085 | 164.82 |
| 151 | 1.702 | 124.24 | 5.005 | 164.10 |
| 152 | 1.712 | 124.24 | 4.908 | 163.01 |
| 153 | 1.722 | 124.24 | 4.810 | 161.84 |
| 154 | 1.732 | 124.23 | 4.713 | 160.81 |
| 155 | 1.742 | 124.23 | 4.592 | 159.06 |
| 156 | 1.752 | 124.24 | 4.494 | 158.05 |
| 157 | 1.762 | 124.24 | 4.396 | 156.73 |
| 158 | 1.772 | 124.24 | 4.299 | 155.45 |
| 159 | 1.782 | 124.24 | 4.200 | 154.01 |
| 160 | 1.792 | 124.25 | 4.103 | 152.90 |
| 161 | 1.802 | 124.24 | 4.005 | 151.50 |
| 162 | 1.812 | 124.25 | 3.908 | 150.11 |
| 163 | 1.822 | 124.25 | 3.810 | 148.39 |
| 164 | 1.832 | 124.25 | 3.713 | 146.90 |
| 165 | 1.842 | 124.26 | 3.590 | 145.04 |
| 166 | 1.852 | 124.25 | 3.492 | 143.09 |
| 167 | 1.861 | 124.26 | 3.395 | 141.61 |
| 168 | 1.872 | 124.27 | 3.297 | 140.00 |
| 169 | 1.881 | 124.27 | 3.199 | 138.43 |
| 170 | 1.892 | 124.27 | 3.104 | 136.73 |
| 171 | 1.901 | 124.27 | 3.006 | 135.09 |
| 172 | 1.911 | 124.26 | 2.908 | 133.54 |
| 173 | 1.921 | 124.26 | 2.810 | 131.92 |
| 174 | 1.931 | 124.27 | 2.712 | 130.25 |

-continued

| | Voltage Meas. Direction | | | |
|---|---|---|---|---|
| | Up | | Down | |
| No. | Voltage/V | Capacitance/pF | Voltage/V | Capacitance/pF |
| 175 | 1.941 | 124.28 | 2.614 | 128.67 |
| 176 | 1.951 | 124.28 | 2.492 | 126.87 |
| 177 | 1.960 | 124.27 | 2.395 | 125.50 |
| 178 | 1.970 | 124.27 | 2.298 | 124.37 |
| 179 | 1.980 | 124.27 | 2.200 | 123.49 |
| 180 | 1.990 | 124.28 | 2.102 | 123.00 |
| 181 | 2.000 | 124.29 | 2.000 | 122.63 |
| 182 | 2.094 | 124.86 | 1.990 | 122.57 |
| 183 | 2.192 | 124.92 | 1.980 | 122.53 |
| 184 | 2.289 | 125.39 | 1.970 | 122.51 |
| 185 | 2.386 | 126.48 | 1.960 | 122.48 |
| 186 | 2.483 | 127.78 | 1.950 | 122.48 |
| 187 | 2.605 | 129.55 | 1.940 | 122.43 |
| 188 | 2.702 | 131.06 | 1.931 | 122.39 |
| 189 | 2.800 | 132.55 | 1.921 | 122.37 |
| 190 | 2.898 | 134.14 | 1.911 | 122.35 |
| 191 | 2.995 | 135.71 | 1.901 | 122.32 |
| 192 | 3.093 | 137.31 | 1.891 | 122.28 |
| 193 | 3.188 | 138.76 | 1.881 | 122.25 |
| 194 | 3.285 | 140.07 | 1.871 | 122.22 |
| 195 | 3.382 | 141.93 | 1.861 | 122.19 |
| 196 | 3.480 | 143.37 | 1.851 | 122.18 |
| 197 | 3.577 | 144.81 | 1.841 | 122.15 |
| 198 | 3.700 | 146.59 | 1.832 | 122.14 |
| 199 | 3.797 | 148.28 | 1.821 | 122.12 |
| 200 | 3.894 | 149.56 | 1.811 | 122.11 |
| 201 | 3.991 | 150.85 | 1.801 | 122.08 |
| 202 | 4.088 | 152.33 | 1.792 | 122.08 |
| 203 | 4.185 | 153.94 | 1.782 | 122.06 |
| 204 | 4.283 | 155.04 | 1.772 | 122.05 |
| 205 | 4.380 | 156.28 | 1.762 | 122.02 |
| 206 | 4.478 | 157.70 | 1.752 | 122.00 |
| 207 | 4.575 | 158.97 | 1.742 | 121.99 |
| 208 | 4.696 | 160.17 | 1.732 | 121.99 |
| 209 | 4.793 | 161.46 | 1.722 | 121.98 |
| 210 | 4.890 | 162.35 | 1.712 | 121.97 |
| 211 | 4.988 | 163.56 | 1.702 | 121.94 |
| 212 | 5.067 | 164.45 | 1.692 | 121.91 |
| 213 | 5.212 | 165.79 | 1.682 | 121.91 |
| 214 | 5.310 | 167.01 | 1.672 | 121.91 |
| 215 | 5.407 | 168.03 | 1.662 | 121.89 |
| 216 | 5.506 | 168.95 | 1.652 | 121.88 |
| 217 | 5.603 | 169.72 | 1.642 | 121.85 |
| 218 | 5.700 | 170.60 | 1.632 | 121.84 |
| 219 | 5.798 | 171.34 | 1.622 | 121.83 |
| 220 | 5.896 | 172.18 | 1.612 | 121.82 |
| 221 | 5.993 | 172.98 | 1.603 | 121.80 |
| 222 | 6.091 | 174.38 | 1.593 | 121.79 |
| 223 | 6.189 | 174.93 | 1.583 | 121.80 |
| 224 | 6.282 | 175.41 | 1.573 | 121.79 |
| 225 | 6.379 | 176.26 | 1.563 | 121.78 |
| 226 | 6.476 | 176.55 | 1.553 | 121.78 |
| 227 | 6.573 | 177.33 | 1.543 | 121.78 |
| 228 | 6.671 | 178.05 | 1.533 | 121.77 |
| 229 | 6.768 | 178.69 | 1.523 | 121.75 |
| 230 | 6.866 | 179.43 | 1.513 | 121.73 |
| 231 | 6.963 | 180.01 | 1.503 | 121.72 |
| 232 | 7.062 | 180.73 | 1.493 | 121.72 |
| 233 | 7.159 | 181.29 | 1.483 | 121.70 |
| 234 | 7.305 | 182.14 | 1.474 | 121.68 |
| 235 | 7.404 | 182.58 | 1.463 | 121.67 |
| 236 | 7.500 | 182.85 | 1.454 | 121.65 |
| 237 | 7.598 | 183.74 | 1.444 | 121.67 |
| 238 | 7.696 | 184.24 | 1.434 | 121.67 |
| 239 | 7.793 | 184.71 | 1.424 | 121.67 |
| 240 | 7.889 | 185.12 | 1.414 | 121.66 |
| 241 | 7.986 | 185.40 | 1.404 | 121.65 |
| 242 | 8.083 | 185.76 | 1.394 | 121.63 |
| 243 | 8.181 | 186.02 | 1.384 | 121.62 |
| 244 | 8.278 | 186.55 | 1.374 | 121.62 |
| 245 | 8.376 | 186.99 | 1.364 | 121.62 |

-continued

| | Voltage Meas. Direction | | | |
|---|---|---|---|---|
| | Up | | Down | |
| No. | Voltage/V | Capacitance/pF | Voltage/V | Capacitance/pF |
| 246 | 8.473 | 187.59 | 1.354 | 121.58 |
| 247 | 8.572 | 188.21 | 1.344 | 121.59 |
| 248 | 8.668 | 188.78 | 1.334 | 121.58 |
| 249 | 8.766 | 189.47 | 1.324 | 121.60 |
| 250 | 8.863 | 190.47 | 1.314 | 121.60 |
| 251 | 8.962 | 192.27 | 1.304 | 121.53 |
| 252 | 9.061 | 280.41 | 1.294 | 121.58 |
| 253 | 9.159 | 280.88 | 1.284 | 121.58 |
| 254 | 9.305 | 281.53 | 1.275 | 121.56 |
| 255 | 9.401 | 281.94 | 1.265 | 121.54 |
| 256 | 9.497 | 282.34 | 1.255 | 121.53 |
| 257 | 9.594 | 282.72 | 1.245 | 121.53 |
| 258 | 9.692 | 283.10 | 1.236 | 121.52 |
| 259 | 9.789 | 283.46 | 1.225 | 121.51 |
| 260 | 9.886 | 283.81 | 1.215 | 121.50 |
| 261 | 9.984 | 284.15 | 1.206 | 121.49 |
| 262 | 10.045 | 284.40 | 1.196 | 121.48 |
| 263 | 10.145 | 284.72 | 1.185 | 121.49 |
| 264 | 10.242 | 285.03 | 1.176 | 121.48 |
| 265 | 10.436 | 285.65 | 1.166 | 121.47 |
| 266 | 10.535 | 285.95 | 1.156 | 121.46 |
| 267 | 10.632 | 286.18 | 1.146 | 121.47 |
| 268 | 10.729 | 286.46 | 1.136 | 121.49 |
| 269 | 10.827 | 286.68 | 1.126 | 121.50 |
| 270 | 10.928 | 286.94 | 1.116 | 121.50 |
| 271 | 11.024 | 287.18 | 1.106 | 121.48 |
| 272 | 11.122 | 287.42 | 1.096 | 121.47 |
| 273 | 11.219 | 287.65 | 1.086 | 121.47 |
| 274 | 11.317 | 287.88 | 1.076 | 121.48 |
| 275 | 11.414 | 288.11 | 1.066 | 121.48 |
| 276 | 11.511 | 288.34 | 1.056 | 121.48 |
| 277 | 11.609 | 288.55 | 1.046 | 121.47 |
| 278 | 11.709 | 288.78 | 1.036 | 121.45 |
| 279 | 11.805 | 289.00 | 1.026 | 121.44 |
| 280 | 11.903 | 289.22 | 1.016 | 121.43 |
| 281 | 12.000 | 289.43 | 1.000 | 121.39 |
| 282 | 12.099 | 289.64 | 0.990 | 121.38 |
| 283 | 12.196 | 289.85 | 0.980 | 121.37 |
| 284 | 12.294 | 290.05 | 0.970 | 121.36 |
| 285 | 12.391 | 290.25 | 0.960 | 121.36 |
| 286 | 12.482 | 290.44 | 0.950 | 121.37 |
| 287 | 12.578 | 290.63 | 0.940 | 121.37 |
| 288 | 12.675 | 290.83 | 0.930 | 121.37 |
| 289 | 12.772 | 291.01 | 0.920 | 121.35 |
| 290 | 12.870 | 291.20 | 0.910 | 121.34 |
| 291 | 12.966 | 291.39 | 0.900 | 121.34 |
| 292 | 13.064 | 291.57 | 0.891 | 121.34 |
| 293 | 13.161 | 291.76 | 0.881 | 121.35 |
| 294 | 13.261 | 291.94 | 0.871 | 121.35 |
| 295 | 13.357 | 292.12 | 0.861 | 121.34 |
| 296 | 13.454 | 292.29 | 0.851 | 121.34 |
| 297 | 13.551 | 292.47 | 0.841 | 121.33 |
| 298 | 13.650 | 292.64 | 0.831 | 121.33 |
| 299 | 13.746 | 292.81 | 0.821 | 121.34 |
| 300 | 13.844 | 292.99 | 0.811 | 121.33 |
| 301 | 13.942 | 293.16 | 0.801 | 121.32 |
| 302 | 14.043 | 293.34 | 0.791 | 121.32 |
| 303 | 14.139 | 293.51 | 0.781 | 121.32 |
| 304 | 14.236 | 293.68 | 0.771 | 121.32 |
| 305 | 14.332 | 293.84 | 0.761 | 121.32 |
| 306 | 14.527 | 294.19 | 0.751 | 121.34 |
| 307 | 14.625 | 294.35 | 0.741 | 121.32 |
| 308 | 14.722 | 294.51 | 0.731 | 121.29 |
| 309 | 14.822 | 294.68 | 0.722 | 121.30 |
| 310 | 14.918 | 294.84 | 0.711 | 121.30 |
| 311 | 15.015 | 295.00 | 0.702 | 121.32 |
| 312 | 15.112 | 295.16 | 0.692 | 121.31 |
| 313 | 15.211 | 295.31 | 0.682 | 121.30 |
| 314 | 15.308 | 295.47 | 0.672 | 121.29 |
| 315 | 15.405 | 295.62 | 0.662 | 121.28 |
| 316 | 15.503 | 295.77 | 0.652 | 121.29 |

-continued

| | Voltage Meas. Direction | | | |
|---|---|---|---|---|
| | Up | | Down | |
| No. | Voltage/V | Capacitance/pF | Voltage/V | Capacitance/pF |
| 317 | 15.599 | 295.92 | 0.642 | 121.29 |
| 318 | 15.695 | 296.06 | 0.632 | 121.29 |
| 319 | 15.792 | 296.21 | 0.622 | 121.28 |
| 320 | 15.888 | 296.35 | 0.612 | 121.26 |
| 321 | 15.987 | 296.50 | 0.602 | 121.25 |
| 322 | 16.083 | 296.64 | 0.592 | 121.27 |
| 323 | 16.180 | 296.78 | 0.582 | 121.29 |
| 324 | 16.277 | 296.92 | 0.573 | 121.28 |
| 325 | 16.377 | 297.06 | 0.563 | 121.28 |
| 326 | 16.473 | 297.20 | 0.553 | 121.27 |
| 327 | 16.570 | 297.33 | 0.543 | 121.26 |
| 328 | 16.667 | 297.47 | 0.533 | 121.25 |
| 329 | 16.766 | 297.61 | 0.523 | 121.25 |
| 330 | 16.862 | 297.74 | 0.513 | 121.27 |
| 331 | 16.960 | 297.87 | 0.500 | 121.24 |
| 332 | 17.058 | 298.00 | 0.490 | 121.24 |
| 333 | 17.160 | 298.13 | 0.480 | 121.23 |
| 334 | 17.255 | 298.26 | 0.470 | 121.24 |
| 335 | 17.352 | 298.39 | 0.460 | 121.24 |
| 336 | 17.448 | 298.51 | 0.450 | 121.24 |
| 337 | 17.547 | 298.64 | 0.440 | 121.25 |
| 338 | 17.643 | 298.76 | 0.430 | 121.24 |
| 339 | 17.741 | 298.89 | 0.420 | 121.23 |
| 340 | 17.838 | 299.01 | 0.410 | 121.20 |
| 341 | 17.939 | 299.13 | 0.400 | 121.25 |
| 342 | 18.034 | 299.25 | 0.390 | 121.26 |
| 343 | 18.131 | 299.37 | 0.381 | 121.25 |
| 344 | 18.228 | 299.49 | 0.371 | 121.24 |
| 345 | 18.328 | 299.61 | 0.361 | 121.26 |
| 346 | 18.424 | 299.72 | 0.351 | 121.25 |
| 347 | 18.620 | 299.95 | 0.341 | 121.24 |
| 348 | 18.716 | 300.06 | 0.331 | 121.23 |
| 349 | 18.811 | 300.17 | 0.321 | 121.24 |
| 350 | 18.907 | 300.28 | 0.311 | 121.24 |
| 351 | 19.003 | 300.39 | 0.301 | 121.26 |
| 352 | 19.102 | 300.50 | 0.291 | 121.23 |
| 353 | 19.197 | 300.61 | 0.281 | 121.22 |
| 354 | 19.295 | 300.72 | 0.271 | 121.23 |
| 355 | 19.392 | 300.83 | 0.261 | 121.25 |
| 356 | 19.492 | 300.94 | 0.251 | 121.25 |
| 357 | 19.587 | 301.04 | 0.241 | 121.25 |
| 358 | 19.684 | 301.15 | 0.231 | 121.24 |
| 359 | 19.780 | 301.25 | 0.221 | 121.25 |
| 360 | 19.880 | 301.36 | 0.209 | 121.26 |
| 361 | 19.975 | 301.46 | 0.200 | 121.19 |

The second transition clearly shows a pronounced hysteresis in the response. The difference between the curve for increasing voltage and that for decreasing voltage is approximately 2.0 V. This is the width of the hysteresis loop. The strong increase of the capacitance occurs at about 9.0 V for increasing voltage, whereas for decreasing voltage the step occurs at about 7.1 V. The slope of the second transition, which commences for increasing voltage at a voltage of about 9.0 V, is very steep. Thus, a small increase in the addressing voltage leads to a strong increase of the capacitance here.

Example 2

A liquid-crystal mixture of the following composition is prepared and investigated as described in example 1.

| | Composition Compound | |
|---|---|---|
| No. | Abbreviation | Conc. |
| 1 | CCP-3-OT | 13.0 |
| 2 | CCU-3-F | 14.0 |
| 3 | CCQU-3-F | 7.0 |
| 4 | PUQU-3-F | 5.0 |
| 5 | PP-1-2V1 | 18.0 |
| 6 | PGP-2-3 | 5.0 |
| 7 | PGP-2-4 | 5.0 |
| 8 | CC-3-V1 | 16.0 |
| 9 | CC-4-V | 17.0 |
| Σ | | 100.0 |

| Physical Properties | |
|---|---|
| T(N, I) = | 74.0° C. |
| T(S, N) < | 20° C. |
| $n_e$ (20° C., 589 nm) = | 1.601 |
| Δn (20° C., 589 nm) = | 0.116 |
| $\epsilon_\perp$ (20° C., 1 kHz) = | 7.5 |
| Δε (20° C., 1 kHz) = | +4.7 |
| $k_1$ (20° C.) = | 24.6 pN |
| $k_3$ (20° C.) = | 807 pN |
| $k_3/k_1$ (20° C.) = | 32.9 |
| $\gamma_1$ (20° C.) = | 56 mPa · s |
| $V_0$ (20° C.) = | 2.40 V |

The results of this example are similar to those of example 1.

Example 3

A liquid-crystal mixture of the following composition is prepared and investigated as described in example 1.

| | Composition Compound | |
|---|---|---|
| No. | Abbreviation | Conc. |
| 1 | PGU-2-F | 8.0 |
| 2 | PGU-3-F | 9.0 |
| 3 | PGU-5-F | 6.0 |
| 4 | PP-1-2V1 | 6.0 |
| 5 | PP-2-2V1 | 10.0 |
| 6 | PGP-2-3 | 8.0 |
| 7 | PGP-2-4 | 8.0 |
| 8 | CP-3-O1 | 18.0 |
| 9 | CC-3-V1 | 5.0 |
| 10 | CCP-V-1 | 12.0 |
| 11 | CCP-V2-1 | 10.0 |
| Σ | | 100.0 |

| Physical Properties | |
|---|---|
| T(NI) = | 74.5° C. |
| T(S, N) < | 25° C. |
| $n_e$ (20° C., 589 nm) = | 1.678 |
| Δn (20° C., 589 nm) = | 0.167 |
| $\epsilon_\perp$ (20° C., 1 kHz) = | 8.3 |
| Δε (20° C., 1 kHz) = | +5.1 |
| $k_1$ (20° C.) = | 28.9 pN |
| $k_3$ (20° C.) = | 304 pN |
| $k_3/k_1$ (20° C.) = | 10.5 |
| $\gamma_1$ (20° C.) = | 79 mPa · s |
| $V_0$ (20° C.) = | 2.13 V |

The results of this example are similar to those of example 1. However, here the hysteresis of the response in the second transition is more pronounced here than in example 1.

Example 4

A liquid-crystal mixture of the following composition is prepared and investigated as described in example 1.

| Composition Compound | | |
|---|---|---|
| No. | Abbreviation | Conc. |
| 1 | CCGU-3-F | 10.0 |
| 2 | PPGU-3-F | 3.0 |
| 3 | PUQU-2-F | 12.0 |
| 4 | PUQU-3-F | 26.0 |
| 5 | PP-1-2V1 | 14.0 |
| 6 | PGP-2-3 | 5.0 |
| 7 | PGP-2-4 | 4.0 |
| 8 | CCP-V-1 | 14.0 |
| 9 | CCP-V2-1 | 12.0 |
| Σ | | 100.0 |

| Physical Properties | |
|---|---|
| T(N, I) = | 82.0° C. |
| T(S, N) < | +20° C. |
| $n_e$ (20° C., 589 nm) = | 1.6599 |
| Δn (20° C., 589 nm) = | 0.1705 |
| $\epsilon_\perp$ (20° C., 1 kHz) = | 21.5 |
| Δε (20° C., 1 kHz) = | +17.7 |
| $k_1$ (20° C.) = | 21.3 pN |
| $k_3$ (20° C.) = | 170 pN |
| $k_3/k_1$ (20° C.) = | 8.0 |
| $\gamma_1$ (20° C.) = | 126 mPa·s |
| $V_0$ (20° C.) = | 1.16 V |

The results of this example are shown in the following table. They are similar to those of example 1, but here the hysteresis of the response in the second transition is less pronounced than in example 1.

| | Meas. Direction Voltage | | | |
|---|---|---|---|---|
| | Up | | Down | |
| No. | Voltage/ V | Capacitance/ pF | Voltage/ V | Capacitance/ pF |
| 1 | 0.200 | 171.52 | 20.033 | 896.57 |
| 2 | 0.209 | 171.50 | 19.937 | 896.53 |
| 3 | 0.221 | 171.42 | 19.837 | 896.33 |
| 4 | 0.231 | 171.39 | 19.741 | 896.48 |
| 5 | 0.241 | 171.35 | 19.644 | 896.55 |
| 6 | 0.251 | 171.34 | 19.548 | 896.11 |
| 7 | 0.261 | 171.34 | 19.448 | 895.95 |
| 8 | 0.271 | 171.32 | 19.351 | 895.84 |
| 9 | 0.281 | 171.30 | 19.253 | 895.33 |
| 10 | 0.291 | 171.28 | 19.158 | 895.00 |
| 11 | 0.301 | 171.28 | 19.059 | 894.51 |
| 12 | 0.311 | 171.27 | 18.963 | 894.80 |
| 13 | 0.321 | 171.24 | 18.866 | 894.45 |
| 14 | 0.331 | 171.23 | 18.771 | 894.66 |
| 15 | 0.341 | 171.21 | 18.674 | 894.49 |
| 16 | 0.351 | 171.20 | 18.478 | 893.91 |
| 17 | 0.361 | 171.22 | 18.382 | 893.84 |
| 18 | 0.370 | 171.21 | 18.282 | 893.66 |
| 19 | 0.380 | 171.21 | 18.185 | 893.21 |
| 20 | 0.390 | 171.20 | 18.088 | 892.95 |
| 21 | 0.400 | 171.18 | 17.992 | 892.58 |
| 22 | 0.410 | 171.18 | 17.891 | 892.33 |
| 23 | 0.420 | 171.17 | 17.793 | 892.32 |
| 24 | 0.430 | 171.18 | 17.695 | 892.09 |
| 25 | 0.440 | 171.18 | 17.599 | 892.23 |
| 26 | 0.450 | 171.17 | 17.500 | 891.46 |
| 27 | 0.460 | 171.16 | 17.403 | 891.08 |
| 28 | 0.470 | 171.17 | 17.306 | 890.71 |
| 29 | 0.480 | 171.16 | 17.211 | 890.61 |
| 30 | 0.490 | 171.16 | 17.108 | 890.33 |
| 31 | 0.500 | 171.15 | 17.011 | 889.87 |
| 32 | 0.513 | 171.18 | 16.913 | 889.41 |
| 33 | 0.523 | 171.18 | 16.816 | 889.27 |
| 34 | 0.533 | 171.19 | 16.717 | 889.06 |
| 35 | 0.543 | 171.19 | 16.620 | 888.83 |
| 36 | 0.552 | 171.20 | 16.522 | 888.51 |
| 37 | 0.563 | 171.19 | 16.427 | 887.94 |
| 38 | 0.572 | 171.18 | 16.326 | 887.77 |
| 39 | 0.582 | 171.17 | 16.229 | 887.35 |
| 40 | 0.592 | 171.18 | 16.131 | 887.08 |
| 41 | 0.602 | 171.18 | 16.035 | 886.81 |
| 42 | 0.612 | 171.21 | 15.936 | 886.39 |
| 43 | 0.622 | 171.19 | 15.840 | 886.07 |
| 44 | 0.632 | 171.19 | 15.742 | 885.74 |
| 45 | 0.642 | 171.19 | 15.647 | 885.39 |
| 46 | 0.652 | 171.19 | 15.550 | 885.05 |
| 47 | 0.662 | 171.19 | 15.452 | 884.46 |
| 48 | 0.672 | 171.20 | 15.354 | 884.12 |
| 49 | 0.682 | 171.19 | 15.257 | 883.85 |
| 50 | 0.691 | 171.19 | 15.158 | 883.53 |
| 51 | 0.701 | 171.19 | 15.061 | 882.91 |
| 52 | 0.711 | 171.20 | 14.963 | 882.56 |
| 53 | 0.721 | 171.21 | 14.867 | 882.11 |
| 54 | 0.731 | 171.22 | 14.767 | 881.87 |
| 55 | 0.741 | 171.24 | 14.669 | 881.52 |
| 56 | 0.751 | 171.23 | 14.571 | 880.87 |
| 57 | 0.761 | 171.22 | 14.376 | 880.02 |
| 58 | 0.771 | 171.23 | 14.279 | 879.83 |
| 59 | 0.781 | 171.25 | 14.182 | 879.33 |
| 60 | 0.791 | 171.26 | 14.086 | 878.80 |
| 61 | 0.801 | 171.26 | 13.984 | 878.36 |
| 62 | 0.811 | 171.26 | 13.887 | 877.78 |
| 63 | 0.821 | 171.25 | 13.789 | 877.44 |
| 64 | 0.831 | 171.26 | 13.692 | 876.98 |
| 65 | 0.841 | 171.28 | 13.593 | 876.65 |
| 66 | 0.851 | 171.30 | 13.496 | 876.05 |
| 67 | 0.861 | 171.31 | 13.398 | 875.56 |
| 68 | 0.870 | 171.30 | 13.302 | 875.04 |
| 69 | 0.881 | 171.31 | 13.202 | 874.59 |
| 70 | 0.890 | 171.31 | 13.105 | 874.25 |
| 71 | 0.900 | 171.33 | 13.007 | 873.69 |
| 72 | 0.910 | 171.34 | 12.911 | 872.91 |
| 73 | 0.920 | 171.36 | 12.812 | 872.44 |
| 74 | 0.930 | 171.37 | 12.715 | 871.88 |
| 75 | 0.940 | 171.37 | 12.618 | 871.51 |
| 76 | 0.950 | 171.38 | 12.522 | 871.00 |
| 77 | 0.960 | 171.40 | 12.430 | 870.58 |
| 78 | 0.970 | 171.42 | 12.332 | 869.73 |
| 79 | 0.980 | 171.44 | 12.234 | 869.29 |
| 80 | 0.990 | 171.44 | 12.137 | 868.89 |
| 81 | 1.000 | 171.46 | 12.038 | 868.29 |
| 82 | 1.016 | 171.55 | 11.940 | 867.63 |
| 83 | 1.026 | 171.58 | 11.843 | 866.75 |
| 84 | 1.036 | 171.62 | 11.746 | 866.18 |
| 85 | 1.046 | 171.67 | 11.646 | 865.78 |
| 86 | 1.056 | 171.72 | 11.548 | 865.14 |
| 87 | 1.066 | 171.80 | 11.450 | 864.60 |
| 88 | 1.076 | 171.93 | 11.353 | 863.75 |
| 89 | 1.086 | 172.06 | 11.255 | 863.17 |
| 90 | 1.096 | 172.36 | 11.157 | 862.47 |
| 91 | 1.106 | 172.72 | 11.060 | 861.90 |
| 92 | 1.116 | 173.17 | 10.964 | 860.93 |
| 93 | 1.126 | 173.66 | 10.862 | 860.38 |
| 94 | 1.136 | 174.22 | 10.764 | 859.63 |
| 95 | 1.146 | 174.83 | 10.667 | 858.94 |
| 96 | 1.156 | 175.50 | 10.570 | 858.33 |
| 97 | 1.166 | 176.18 | 10.471 | 857.56 |
| 98 | 1.175 | 176.91 | 10.276 | 856.06 |
| 99 | 1.185 | 177.67 | 10.179 | 855.11 |
| 100 | 1.196 | 178.45 | 10.079 | 854.46 |
| 101 | 1.205 | 179.26 | 10.017 | 853.97 |
| 102 | 1.215 | 180.08 | 9.919 | 853.34 |
| 103 | 1.225 | 180.93 | 9.822 | 852.43 |
| 104 | 1.235 | 181.81 | 9.724 | 851.51 |

-continued

| No. | Meas. Direction Voltage | | | |
|---|---|---|---|---|
| | Up | | Down | |
| | Voltage/ V | Capacitance/ pF | Voltage/ V | Capacitance/ pF |
| 105 | 1.245 | 182.72 | 9.626 | 850.43 |
| 106 | 1.255 | 183.62 | 9.529 | 849.78 |
| 107 | 1.265 | 184.52 | 9.432 | 848.93 |
| 108 | 1.275 | 185.37 | 9.336 | 847.96 |
| 109 | 1.284 | 186.34 | 9.190 | 846.52 |
| 110 | 1.294 | 187.36 | 9.092 | 845.46 |
| 111 | 1.304 | 188.30 | 8.995 | 844.68 |
| 112 | 1.314 | 189.26 | 8.895 | 843.89 |
| 113 | 1.324 | 190.26 | 8.799 | 842.58 |
| 114 | 1.334 | 191.25 | 8.701 | 841.40 |
| 115 | 1.344 | 192.32 | 8.604 | 840.64 |
| 116 | 1.354 | 193.37 | 8.504 | 839.71 |
| 117 | 1.364 | 194.38 | 8.407 | 838.33 |
| 118 | 1.374 | 195.36 | 8.309 | 837.16 |
| 119 | 1.384 | 196.46 | 8.212 | 836.23 |
| 120 | 1.394 | 197.63 | 8.113 | 835.30 |
| 121 | 1.404 | 198.76 | 8.016 | 834.17 |
| 122 | 1.414 | 199.75 | 7.918 | 832.46 |
| 123 | 1.424 | 200.86 | 7.822 | 831.49 |
| 124 | 1.434 | 202.19 | 7.725 | 830.42 |
| 125 | 1.444 | 203.29 | 7.627 | 829.27 |
| 126 | 1.454 | 204.33 | 7.529 | 827.50 |
| 127 | 1.463 | 205.38 | 7.432 | 826.30 |
| 128 | 1.473 | 206.57 | 7.333 | 824.99 |
| 129 | 1.483 | 207.70 | 7.186 | 822.96 |
| 130 | 1.493 | 208.91 | 7.089 | 821.29 |
| 131 | 1.503 | 210.29 | 6.990 | 820.14 |
| 132 | 1.513 | 211.39 | 6.893 | 818.71 |
| 133 | 1.523 | 212.51 | 6.795 | 816.78 |
| 134 | 1.533 | 213.79 | 6.698 | 815.14 |
| 135 | 1.543 | 215.08 | 6.599 | 813.60 |
| 136 | 1.553 | 216.15 | 6.502 | 812.20 |
| 137 | 1.563 | 217.30 | 6.404 | 810.58 |
| 138 | 1.573 | 218.54 | 6.307 | 808.41 |
| 139 | 1.583 | 219.98 | 6.213 | 806.55 |
| 140 | 1.593 | 221.11 | 6.115 | 804.99 |
| 141 | 1.603 | 222.24 | 6.017 | 802.57 |
| 142 | 1.613 | 223.41 | 5.920 | 800.55 |
| 143 | 1.622 | 224.66 | 5.821 | 798.64 |
| 144 | 1.632 | 225.82 | 5.723 | 796.55 |
| 145 | 1.642 | 226.94 | 5.626 | 794.50 |
| 146 | 1.652 | 228.12 | 5.528 | 792.14 |
| 147 | 1.662 | 229.40 | 5.429 | 789.43 |
| 148 | 1.672 | 230.80 | 5.332 | 786.65 |
| 149 | 1.682 | 231.93 | 5.234 | 784.22 |
| 150 | 1.692 | 233.15 | 5.088 | 779.89 |
| 151 | 1.702 | 234.14 | 5.008 | 777.27 |
| 152 | 1.712 | 235.60 | 4.910 | 773.84 |
| 153 | 1.722 | 237.29 | 4.813 | 770.31 |
| 154 | 1.732 | 238.51 | 4.715 | 762.73 |
| 155 | 1.742 | 239.55 | 4.594 | 740.34 |
| 156 | 1.752 | 240.77 | 4.498 | 572.11 |
| 157 | 1.762 | 241.97 | 4.400 | 513.96 |
| 158 | 1.772 | 243.16 | 4.303 | 503.40 |
| 159 | 1.782 | 244.38 | 4.204 | 471.73 |
| 160 | 1.792 | 245.99 | 4.107 | 466.53 |
| 161 | 1.802 | 246.84 | 4.009 | 457.16 |
| 162 | 1.812 | 248.30 | 3.912 | 449.12 |
| 163 | 1.821 | 249.61 | 3.814 | 443.39 |
| 164 | 1.832 | 250.79 | 3.717 | 435.42 |
| 165 | 1.841 | 252.03 | 3.594 | 429.08 |
| 166 | 1.851 | 253.41 | 3.496 | 421.78 |
| 167 | 1.861 | 254.49 | 3.398 | 414.58 |
| 168 | 1.872 | 255.84 | 3.300 | 409.30 |
| 169 | 1.881 | 256.89 | 3.203 | 403.42 |
| 170 | 1.891 | 258.41 | 3.107 | 396.86 |
| 171 | 1.901 | 259.51 | 3.009 | 390.72 |
| 172 | 1.911 | 261.05 | 2.911 | 382.85 |
| 173 | 1.921 | 262.38 | 2.813 | 376.21 |
| 174 | 1.931 | 263.61 | 2.715 | 368.59 |
| 175 | 1.940 | 264.92 | 2.617 | 360.38 |
| 176 | 1.950 | 265.81 | 2.495 | 349.50 |
| 177 | 1.960 | 267.25 | 2.397 | 339.61 |
| 178 | 1.970 | 268.29 | 2.300 | 329.81 |
| 179 | 1.980 | 269.77 | 2.202 | 319.38 |
| 180 | 1.990 | 270.86 | 2.104 | 307.64 |
| 181 | 2.000 | 271.98 | 2.002 | 295.52 |
| 182 | 2.102 | 283.19 | 1.992 | 294.07 |
| 183 | 2.200 | 293.90 | 1.982 | 292.90 |
| 184 | 2.298 | 303.99 | 1.972 | 291.55 |
| 185 | 2.395 | 313.22 | 1.962 | 290.15 |
| 186 | 2.492 | 322.28 | 1.952 | 288.75 |
| 187 | 2.615 | 332.95 | 1.942 | 287.29 |
| 188 | 2.713 | 340.40 | 1.932 | 285.79 |
| 189 | 2.811 | 348.69 | 1.922 | 284.45 |
| 190 | 2.908 | 355.21 | 1.913 | 283.40 |
| 191 | 3.006 | 361.64 | 1.903 | 282.17 |
| 192 | 3.104 | 368.51 | 1.893 | 280.81 |
| 193 | 3.200 | 373.74 | 1.883 | 279.32 |
| 194 | 3.297 | 379.36 | 1.873 | 277.95 |
| 195 | 3.395 | 384.51 | 1.863 | 276.65 |
| 196 | 3.493 | 389.78 | 1.853 | 275.50 |
| 197 | 3.591 | 394.45 | 1.843 | 274.21 |
| 198 | 3.713 | 400.44 | 1.833 | 272.81 |
| 199 | 3.811 | 404.56 | 1.823 | 271.45 |
| 200 | 3.908 | 408.25 | 1.813 | 270.05 |
| 201 | 4.005 | 411.81 | 1.803 | 268.91 |
| 202 | 4.103 | 415.00 | 1.793 | 267.69 |
| 203 | 4.201 | 419.48 | 1.783 | 266.35 |
| 204 | 4.299 | 422.54 | 1.773 | 264.91 |
| 205 | 4.397 | 425.34 | 1.763 | 263.55 |
| 206 | 4.495 | 428.63 | 1.754 | 262.23 |
| 207 | 4.592 | 431.25 | 1.743 | 261.06 |
| 208 | 4.713 | 434.41 | 1.733 | 259.41 |
| 209 | 4.810 | 437.28 | 1.723 | 258.30 |
| 210 | 4.908 | 439.85 | 1.713 | 257.08 |
| 211 | 5.006 | 442.57 | 1.703 | 255.81 |
| 212 | 5.086 | 445.09 | 1.693 | 254.51 |
| 213 | 5.232 | 448.86 | 1.684 | 253.12 |
| 214 | 5.330 | 452.11 | 1.674 | 252.06 |
| 215 | 5.427 | 455.28 | 1.664 | 250.69 |
| 216 | 5.527 | 513.06 | 1.654 | 249.33 |
| 217 | 5.624 | 673.62 | 1.644 | 247.87 |
| 218 | 5.722 | 739.19 | 1.634 | 246.77 |
| 219 | 5.819 | 744.49 | 1.624 | 245.51 |
| 220 | 5.918 | 753.33 | 1.614 | 244.22 |
| 221 | 6.016 | 757.16 | 1.604 | 242.92 |
| 222 | 6.114 | 762.21 | 1.594 | 241.67 |
| 223 | 6.212 | 766.94 | 1.584 | 240.45 |
| 224 | 6.306 | 772.32 | 1.574 | 239.14 |
| 225 | 6.403 | 775.56 | 1.564 | 238.03 |
| 226 | 6.500 | 780.37 | 1.555 | 236.75 |
| 227 | 6.598 | 784.57 | 1.544 | 235.45 |
| 228 | 6.696 | 787.34 | 1.535 | 234.15 |
| 229 | 6.794 | 790.16 | 1.525 | 232.94 |
| 230 | 6.891 | 793.12 | 1.515 | 231.84 |
| 231 | 6.989 | 796.86 | 1.505 | 230.64 |
| 232 | 7.088 | 799.25 | 1.495 | 229.45 |
| 233 | 7.185 | 801.82 | 1.485 | 228.18 |
| 234 | 7.332 | 804.65 | 1.475 | 226.96 |
| 235 | 7.431 | 806.45 | 1.465 | 225.72 |
| 236 | 7.528 | 808.45 | 1.455 | 224.62 |
| 237 | 7.626 | 810.14 | 1.445 | 223.47 |
| 238 | 7.724 | 812.76 | 1.435 | 222.28 |
| 239 | 7.821 | 814.49 | 1.425 | 221.05 |
| 240 | 7.918 | 815.97 | 1.415 | 219.87 |
| 241 | 8.015 | 817.55 | 1.405 | 218.72 |
| 242 | 8.112 | 819.63 | 1.395 | 217.64 |
| 243 | 8.211 | 821.15 | 1.385 | 216.47 |
| 244 | 8.308 | 822.61 | 1.375 | 215.33 |
| 245 | 8.407 | 824.73 | 1.365 | 214.13 |
| 246 | 8.504 | 825.97 | 1.355 | 213.13 |

-continued

| | Meas. Direction Voltage | | | |
|---|---|---|---|---|
| | Up | | Down | |
| No. | Voltage/ V | Capacitance/ pF | Voltage/ V | Capacitance/ pF |
| 247 | 8.604 | 827.95 | 1.345 | 212.03 |
| 248 | 8.700 | 829.23 | 1.335 | 210.97 |
| 249 | 8.798 | 830.34 | 1.325 | 209.87 |
| 250 | 8.896 | 831.94 | 1.315 | 208.83 |
| 251 | 8.995 | 833.41 | 1.305 | 207.77 |
| 252 | 9.092 | 835.02 | 1.295 | 206.80 |
| 253 | 9.190 | 835.75 | 1.286 | 205.82 |
| 254 | 9.337 | 837.37 | 1.276 | 204.83 |
| 255 | 9.433 | 839.10 | 1.266 | 203.83 |
| 256 | 9.530 | 840.40 | 1.256 | 202.92 |
| 257 | 9.628 | 841.58 | 1.246 | 201.97 |
| 258 | 9.726 | 842.29 | 1.237 | 201.03 |
| 259 | 9.824 | 843.34 | 1.226 | 200.02 |
| 260 | 9.921 | 844.65 | 1.216 | 199.16 |
| 261 | 10.019 | 845.50 | 1.207 | 198.30 |
| 262 | 10.081 | 846.29 | 1.197 | 197.42 |
| 263 | 10.182 | 847.07 | 1.186 | 196.56 |
| 264 | 10.278 | 848.48 | 1.177 | 195.74 |
| 265 | 10.473 | 849.93 | 1.167 | 194.93 |
| 266 | 10.573 | 850.75 | 1.157 | 194.13 |
| 267 | 10.670 | 852.03 | 1.147 | 193.35 |
| 268 | 10.768 | 852.77 | 1.137 | 192.68 |
| 269 | 10.866 | 853.42 | 1.127 | 191.99 |
| 270 | 10.967 | 854.25 | 1.117 | 191.33 |
| 271 | 11.064 | 855.23 | 1.107 | 190.67 |
| 272 | 11.161 | 855.70 | 1.097 | 190.07 |
| 273 | 11.259 | 857.05 | 1.087 | 189.53 |
| 274 | 11.358 | 858.01 | 1.077 | 189.04 |
| 275 | 11.454 | 858.36 | 1.067 | 188.56 |
| 276 | 11.552 | 859.19 | 1.057 | 188.14 |
| 277 | 11.650 | 860.03 | 1.047 | 187.75 |
| 278 | 11.751 | 860.52 | 1.037 | 187.41 |
| 279 | 11.848 | 861.13 | 1.027 | 187.07 |
| 280 | 11.945 | 862.30 | 1.017 | 186.76 |
| 281 | 12.043 | 862.94 | 1.001 | 186.28 |
| 282 | 12.142 | 863.37 | 0.991 | 186.03 |
| 283 | 12.239 | 864.23 | 0.981 | 185.80 |
| 284 | 12.338 | 865.10 | 0.971 | 185.57 |
| 285 | 12.436 | 865.38 | 0.961 | 185.35 |
| 286 | 12.527 | 865.91 | 0.951 | 185.16 |
| 287 | 12.623 | 866.60 | 0.941 | 184.97 |
| 288 | 12.721 | 867.49 | 0.931 | 184.80 |
| 289 | 12.818 | 867.77 | 0.921 | 184.63 |
| 290 | 12.917 | 868.61 | 0.911 | 184.46 |
| 291 | 13.013 | 869.23 | 0.901 | 184.29 |
| 292 | 13.111 | 869.55 | 0.891 | 184.15 |
| 293 | 13.208 | 869.79 | 0.881 | 184.03 |
| 294 | 13.308 | 870.46 | 0.871 | 183.90 |
| 295 | 13.405 | 871.07 | 0.861 | 183.77 |
| 296 | 13.502 | 871.57 | 0.851 | 183.65 |
| 297 | 13.600 | 872.20 | 0.841 | 183.52 |
| 298 | 13.699 | 872.63 | 0.831 | 183.40 |
| 299 | 13.795 | 872.97 | 0.821 | 183.30 |
| 300 | 13.893 | 873.87 | 0.811 | 183.20 |
| 301 | 13.991 | 874.10 | 0.802 | 183.09 |
| 302 | 14.093 | 874.92 | 0.792 | 182.99 |
| 303 | 14.189 | 875.15 | 0.782 | 182.89 |
| 304 | 14.286 | 876.00 | 0.772 | 182.80 |
| 305 | 14.383 | 876.24 | 0.762 | 182.72 |
| 306 | 14.579 | 877.18 | 0.752 | 182.64 |
| 307 | 14.677 | 877.77 | 0.742 | 182.55 |
| 308 | 14.774 | 878.21 | 0.732 | 182.46 |
| 309 | 14.875 | 878.83 | 0.722 | 182.39 |
| 310 | 14.971 | 878.81 | 0.712 | 182.31 |
| 311 | 15.069 | 879.07 | 0.702 | 182.25 |
| 312 | 15.166 | 879.65 | 0.692 | 182.18 |
| 313 | 15.266 | 880.38 | 0.682 | 182.11 |
| 314 | 15.362 | 880.89 | 0.672 | 182.05 |
| 315 | 15.461 | 880.77 | 0.662 | 181.98 |
| 316 | 15.558 | 881.50 | 0.652 | 181.92 |
| 317 | 15.655 | 881.92 | 0.642 | 181.86 |
| 318 | 15.751 | 882.20 | 0.633 | 181.81 |
| 319 | 15.848 | 882.47 | 0.623 | 181.75 |
| 320 | 15.945 | 883.06 | 0.613 | 181.70 |
| 321 | 16.044 | 883.37 | 0.603 | 181.65 |
| 322 | 16.140 | 883.78 | 0.593 | 181.58 |
| 323 | 16.238 | 884.23 | 0.583 | 181.53 |
| 324 | 16.336 | 884.48 | 0.573 | 181.48 |
| 325 | 16.436 | 884.96 | 0.563 | 181.44 |
| 326 | 16.532 | 885.16 | 0.553 | 181.39 |
| 327 | 16.630 | 885.64 | 0.543 | 181.34 |
| 328 | 16.727 | 885.89 | 0.533 | 181.30 |
| 329 | 16.826 | 886.32 | 0.523 | 181.25 |
| 330 | 16.923 | 886.68 | 0.513 | 181.20 |
| 331 | 17.021 | 886.88 | 0.500 | 181.11 |
| 332 | 17.119 | 887.17 | 0.490 | 181.06 |
| 333 | 17.221 | 887.92 | 0.480 | 181.02 |
| 334 | 17.317 | 888.25 | 0.470 | 180.99 |
| 335 | 17.414 | 888.55 | 0.460 | 180.95 |
| 336 | 17.511 | 888.87 | 0.450 | 180.91 |
| 337 | 17.610 | 888.78 | 0.440 | 180.89 |
| 338 | 17.706 | 889.13 | 0.430 | 180.84 |
| 339 | 17.804 | 889.51 | 0.421 | 180.81 |
| 340 | 17.902 | 889.71 | 0.411 | 180.77 |
| 341 | 18.003 | 890.33 | 0.401 | 180.73 |
| 342 | 18.099 | 890.56 | 0.391 | 180.71 |
| 343 | 18.197 | 890.63 | 0.381 | 180.67 |
| 344 | 18.294 | 891.11 | 0.371 | 180.64 |
| 345 | 18.394 | 891.49 | 0.361 | 180.61 |
| 346 | 18.490 | 891.65 | 0.351 | 180.59 |
| 347 | 18.687 | 892.17 | 0.341 | 180.56 |
| 348 | 18.783 | 892.41 | 0.331 | 180.53 |
| 349 | 18.878 | 892.74 | 0.321 | 180.50 |
| 350 | 18.975 | 893.10 | 0.311 | 180.47 |
| 351 | 19.071 | 893.40 | 0.301 | 180.45 |
| 352 | 19.171 | 893.63 | 0.291 | 180.43 |
| 353 | 19.266 | 893.73 | 0.281 | 180.40 |
| 354 | 19.364 | 894.05 | 0.271 | 180.37 |
| 355 | 19.461 | 894.35 | 0.261 | 180.35 |
| 356 | 19.562 | 894.61 | 0.251 | 180.32 |
| 357 | 19.657 | 894.80 | 0.241 | 180.30 |
| 358 | 19.754 | 895.00 | 0.232 | 180.29 |
| 359 | 19.851 | 895.17 | 0.222 | 180.28 |
| 360 | 19.950 | 895.50 | 0.209 | 180.26 |
| 361 | 20.046 | 895.84 | 0.200 | 180.17 |

Here the steep increase of the capacitance in the second transition occurs for increasing voltage at a voltage of about 5.5 V, whereas for decreasing voltage it occurs at about 4.9 V. I.e. the width of the hysterics is about 1.6 V here.

Example 5

A liquid-crystal mixture of the following composition is prepared and investigated as described in example 1.

| Composition Compound | | |
|---|---|---|
| No. | Abbreviation | Conc. |
| 1 | CCGU-3-F | 10.0 |
| 2 | PPGU-3-F | 5.0 |
| 3 | PUQU-2-F | 10.0 |
| 4 | PUQU-3-F | 12.0 |
| 5 | PGP-2-3 | 5.0 |
| 6 | PGP-2-4 | 8.0 |
| 7 | CPU-5-F | 24.0 |

-continued

| | | |
|---|---|---|
| 8 | CC-3-14 | 14.0 |
| 9 | GGP-3-Cl | 4.0 |
| 10 | GGP-5-Cl | 8.0 |
| Σ | | 100.0 |

Physical Properties

| | |
|---|---|
| T(N, I) = | 84.5° C. |
| T(S, N) < | 20° C. |
| $n_e$ (20° C., 589 nm) = | 1.660 |
| Δn (20° C., 589 nm) = | 0.161 |
| $\epsilon_\perp$ (20° C., 1 kHz) = | 4.3 |
| Δε (20° C., 1 kHz) = | 17.5 |
| $k_1$ (20° C.) = | 18.3 pN |
| $k_3$ (20° C.) = | 101 pN |
| $k_3/k_1$ (20° C.) = | 5.5 |
| $\gamma_1$ (20° C.) = | 150 mPa·s |
| $V_0$ (20° C.) = | 1.09 V |

The results of this example are similar to those of example 1.

The invention claimed is:

1. A modulation element for electromagnetic radiation comprising
an electrode arrangement, and
a mesogenic modulation medium,
wherein
the mesogenic modulation medium has a positive dielectric anisotropy and a cybotactic nematic phase, and
the modulation element provides modulation with an operational temperature range and there is at least one single temperature within said operational temperature range at which said modulation element shows two or more distinct electro-optical transitions.

2. The modulation element according to claim 1, wherein the electrode arrangement is able to generate an electric field having a significant component perpendicular to a main plane or layer of the mesogenic modulation medium.

3. The modulation element according to claim 1, wherein the modulation element is operated at a temperature at which the mesogenic modulation medium shows two distinct transitions.

4. The modulation element according to claim 1, wherein the modulation element is operated at a temperature at which the mesogenic modulation medium shows a hysteresis in its response to the electric field.

5. The modulation element according to claim 1, wherein the mesogenic modulation medium is in the form of a layer, and the electrode comprises at least two parts, at least one part each of which arrangement is located on either of the two sides of the layer of the mesogenic modulation medium.

6. The modulation element according to claim 1, wherein the modulation element is a light modulation element.

7. The light modulation element according to claim 6, further comprising at least one element for polarization of light.

8. The light modulation element according to claim 6, wherein light during passage through the light modulation element in each case passes through at least one element for polarization of the light before passing through the mesogenic modulation medium and after passing through the mesogenic modulation medium.

9. The light modulation element according to claim 6, wherein the light modulation element further contains an additional birefringent layer.

10. An electro-optical display comprising one or more light modulation elements according to claim 6.

11. The electro-optical display according to claim 10, wherein the display is addressed by means of an active matrix.

12. An electro-optical display system containing one or more electro-optical displays according to claim 10.

13. The electro-optical display system according to claim 12, wherein the system can be used as a television monitor and/or as a computer monitor.

14. A method of using a light modulation element according to claim 6, comprising displaying information with said light modulation element.

15. A method of using an electro-optical display according to claim 10 in an electro-optical display system.

16. A method of using an electro-optical display system according to claim 12 for the display of video signals.

17. The modulation element according to claim 1, wherein the modulation element is operable in the micrometer wave range.

18. A modulation device comprising one or more modulation elements according to claim 17.

19. A mesogenic modulation medium wherein said modulation medium has a positive dielectric anisotropy and a cybotactic nematic phase, and
the mesogenic modulation medium provides modulation with an operational temperature range and there is at least one single temperature within said operational temperature range at which said mesogenic modulation medium shows two or more distinct electro-optical transitions.

20. A modulation element for electromagnetic radiation comprising
an electrode arrangement, and
a mesogenic modulation medium,
wherein
the mesogenic modulation medium has a positive dielectric anisotropy, an elastic constant k3 of 100 pN at at least one of the operation temperatures of the modulation element, and a cybotactic nematic phase, and
the modulation element shows two or more distinct electro-optical transitions at a temperature of 20° C.

21. The light modulation element according to claim 20, wherein said mesogenic modulation medium comprises one or more compounds of formula I-4:

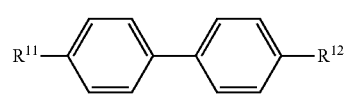

I-4 wherein
$R^{11}$ and $R^{12}$ are, independently of each other, alkyl or alkoxy with 1 to 15 C atoms or alkoxyalkyl, alkenyl, or alkenyloxy with 2 to 15 C atoms.

22. The light modulation element according to claim 21, wherein
$R^{11}$ is alkyl, and
$R^{12}$ is alkenyl.

23. The light modulation element according to claim 22, wherein
$R^{11}$ is methyl and
$R^{12}$ is vinyl, 1E-propenyl, 1E-butenyl, 3E-butenyl or 3E-pentenyl.

24. The light modulation element according to claim 21, wherein
(a) $R^{11}$ is alkyl and $R^{12}$ is alkyl;
(b) $R^{11}$ is alkoxy and $R^{12}$ is alkyl;
(c) $R^{11}$ is alkenyl and $R^{12}$ is alkyl; or
(d) $R^{11}$ is alkenyl and $R^{12}$ is alkenyl.

25. The light modulation element according to claim 20, wherein said mesogenic modulation medium comprises one or more compounds of formula II:

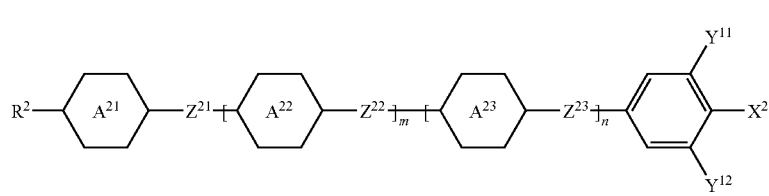

wherein
$R^2$ is alkyl or alkoxy with 1 to 15 C atoms or alkoxyalkyl, alkenyl, alkenyloxy with 1 to 15 C atoms;

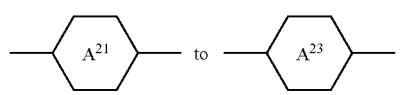

each, independently of one another, are

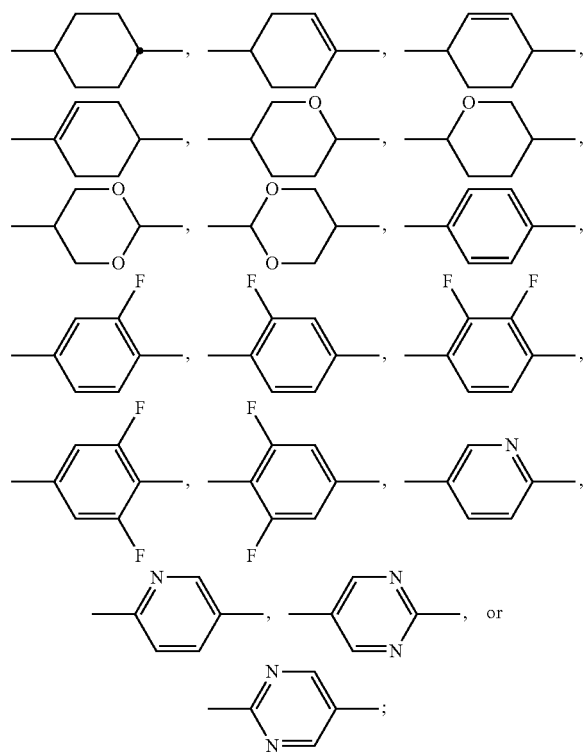

$X^2$ is halogen, halogenated alkyl, alkoxy, alkenyl or alkenyloxy;
$Y^{21}$ and $Y^{22}$ are each, independently of each other, H or F;
$Z^{21}$ to $Z^{23}$ are each, independently of one another, a single bond, —CH$_2$—CH$_2$—, —CO—O—, trans —CH=CH—, —CH=CF—, —CF=CH—, —CF=CF—, —CH=CH—CO—O—, —CF=CF—CO—O—, —CF=CH—CO—O—, —CH=CF—CO—O—, —CF$_2$—O—, —O—CF$_2$—, —CH$_2$—O—, —O—CH$_2$— or —C≡C—;
m and n are each, independently of one another, 0, 1 or 2; and
m+n is 0, 1, 2 or 3.

26. The light modulation element according to claim 25, wherein

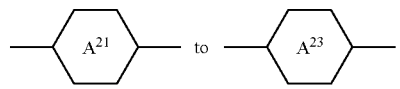

each, independently of one another, are

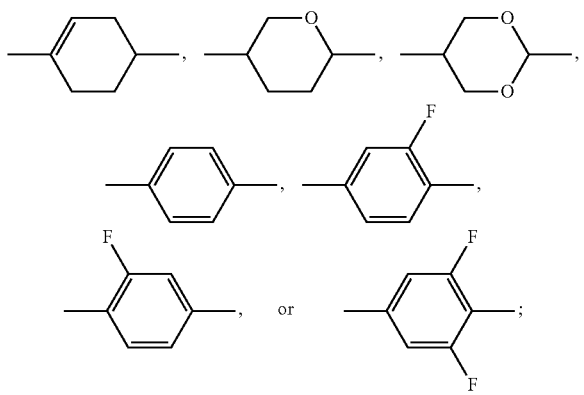

$X^2$ is F, Cl, —CF$_3$, —OCF$_3$, or —OCHF$_2$;
at least one of $Y^{21}$ and $Y^{22}$ is F,
$Z^{21}$ to $Z^{23}$ are each, independently of one another a single bond, —CH$_2$—CH$_2$— or —CF$_2$—O—;
m and n are each, independently of one another, 0 or 1.

27. A modulation element for electromagnetic radiation comprising
an electrode arrangement, and
a mesogenic modulation medium,
wherein
the mesogenic modulation medium has a positive dielectric anisotropy and a cybotactic nematic phase, and
when applying voltage to said modulation element in an increasing manner and then a decreasing manner, said modulation element shows at a first operating temperature a first distinct electro-optical transition when voltage is increasing, and shows at that same first operating temperature a second distinct electro-optical transition when voltage is decreasing.

* * * * *

UNITED STATES PATENT AND TRADEMARK OFFICE
CERTIFICATE OF CORRECTION

PATENT NO. : 8,804,092 B2  Page 1 of 1
APPLICATION NO. : 12/600071
DATED : August 12, 2014
INVENTOR(S) : Dagmar Klement et al.

It is certified that error appears in the above-identified patent and that said Letters Patent is hereby corrected as shown below:

In the Claims

Column 62, Line 30: formula reads:

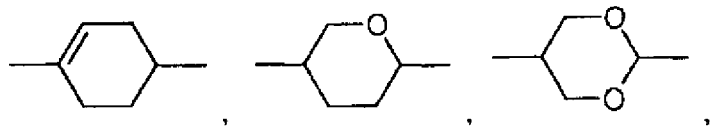

should read:

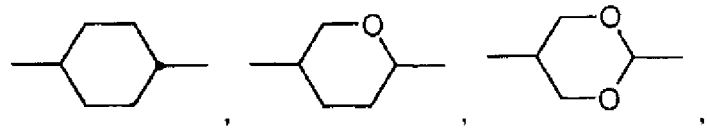

Signed and Sealed this
Third Day of March, 2015

Michelle K. Lee
*Deputy Director of the United States Patent and Trademark Office*